(12) United States Patent
Ette et al.

(10) Patent No.: US 10,300,885 B2
(45) Date of Patent: May 28, 2019

(54) METHOD, CONTROL APPARATUS AND VEHICLE

(71) Applicant: VOLKSWAGEN AKTIENGESELLSCHAFT, Wolfsburg (DE)

(72) Inventors: Bernd Ette, Wolfsburg (DE); Rico Petrick, Dresden (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 15/738,629

(22) PCT Filed: Jun. 6, 2016

(86) PCT No.: PCT/EP2016/062770
§ 371 (c)(1),
(2) Date: Dec. 21, 2017

(87) PCT Pub. No.: WO2017/005430
PCT Pub. Date: Jan. 12, 2017

(65) Prior Publication Data
US 2018/0178753 A1 Jun. 28, 2018

(30) Foreign Application Priority Data
Jul. 8, 2015 (DE) .................. 10 2015 212 782

(51) Int. Cl.
*B60R 25/01* (2013.01)
*G01S 1/12* (2006.01)
(Continued)

(52) U.S. Cl.
CPC .............. *B60R 25/01* (2013.01); *B60R 25/20* (2013.01); *G01S 1/12* (2013.01); *G01S 1/14* (2013.01);
(Continued)

(58) Field of Classification Search
CPC ....... H04B 17/104; B60R 25/01; B60R 25/02; G01S 1/14; G01S 1/12; G01S 1/01
(Continued)

(56) References Cited

U.S. PATENT DOCUMENTS 4,054,881 A 10/1977 Raab
5,425,367 A 6/1995 Shapiro et al.
(Continued)

FOREIGN PATENT DOCUMENTS

| DE | 69320274 T2 | 4/1999 |
| DE | 102008012606 A1 | 12/2009 |
| DE | 102012017387 A1 | 3/2014 |

OTHER PUBLICATIONS

Search Report for German Patent Application No. 10 2015 212 782.6, dated Mar. 7, 2016.
(Continued)

*Primary Examiner* — Allen T Cao
(74) *Attorney, Agent, or Firm* — Barnes & Thornburg LLP

(57) ABSTRACT

A transmitter which emits at least two electromagnetic fields. An amplitude of each of the at least two electromagnetic fields has an anisotropy in one plane. An angular arrangement of the receiver relative to the transmitter is determined based on the amplitude of the at least two electromagnetic fields at the position of a receiver.

30 Claims, 24 Drawing Sheets

(51) Int. Cl.
| | |
|---|---|
| *G01S 1/14* | (2006.01) |
| *G01S 1/46* | (2006.01) |
| *G01S 5/12* | (2006.01) |
| *H04B 17/10* | (2015.01) |
| *B60R 25/20* | (2013.01) |
| *H04B 1/03* | (2006.01) |
| *G01S 11/06* | (2006.01) |
| *G01B 7/00* | (2006.01) |

(52) U.S. Cl.
CPC ............... *G01S 1/46* (2013.01); *G01S 5/12* (2013.01); *H04B 1/03* (2013.01); *H04B 17/104* (2015.01); *G01B 7/003* (2013.01); *G01S 11/06* (2013.01)

(58) Field of Classification Search
USPC .................................. 340/5.7–5.73, 5.7–5.72
See application file for complete search history.

(56) References Cited

U.S. PATENT DOCUMENTS

| | | | | | |
|---|---|---|---|---|---|
| 5,646,525 | A | * | 7/1997 | Gilboa | F41G 3/225 |
| | | | | | 324/207.17 |
| 5,835,452 | A | * | 11/1998 | Mueller | G01V 1/284 |
| | | | | | 367/75 |
| 9,811,958 | B1 | * | 11/2017 | Hall | H04W 4/35 |
| 9,879,466 | B1 | * | 1/2018 | Yu | E05F 15/76 |
| 2014/0118111 | A1 | * | 5/2014 | Saladin | E05F 15/77 |
| | | | | | 340/7.51 |
| 2015/0084779 | A1 | * | 3/2015 | Saladin | G07C 9/00896 |
| | | | | | 340/686.6 |

OTHER PUBLICATIONS

Search Report for International Patent Application No. PCT/EP2016/062770, dated Sep. 19, 2016.

* cited by examiner

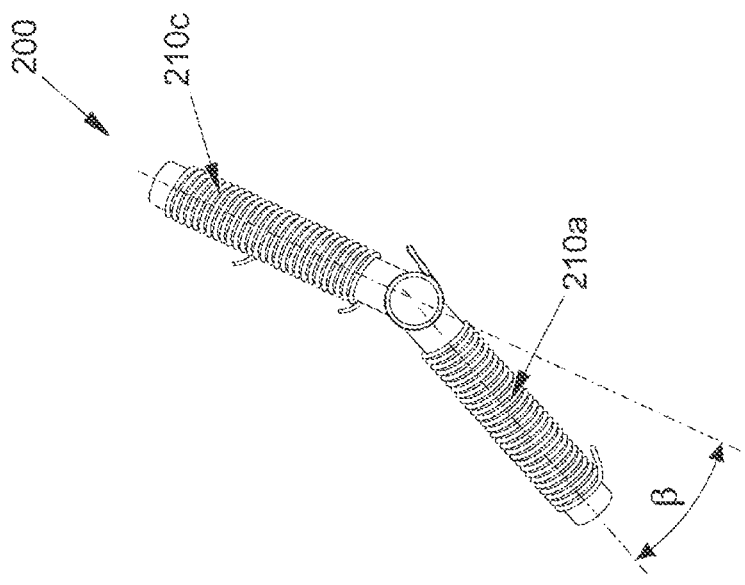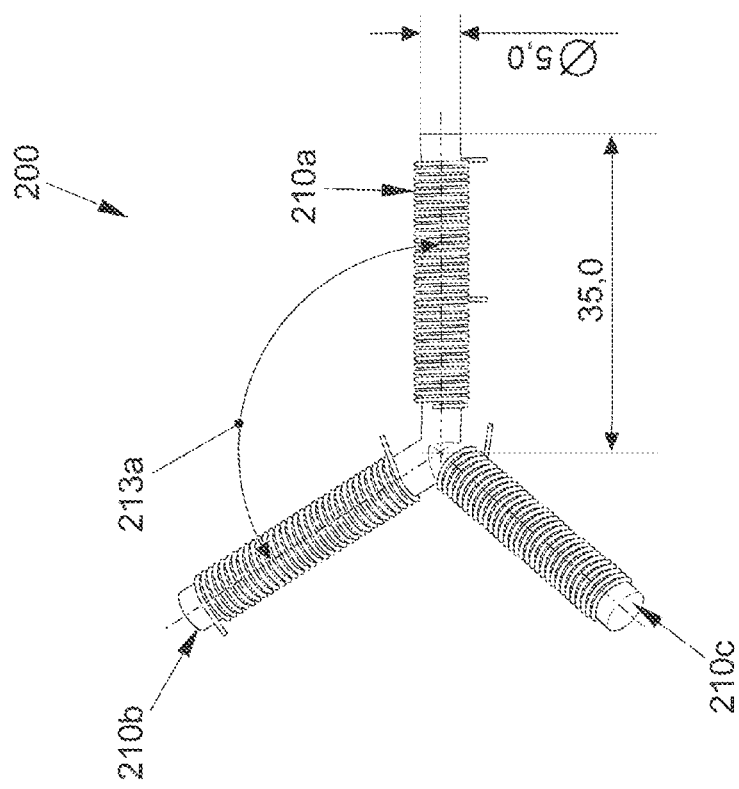

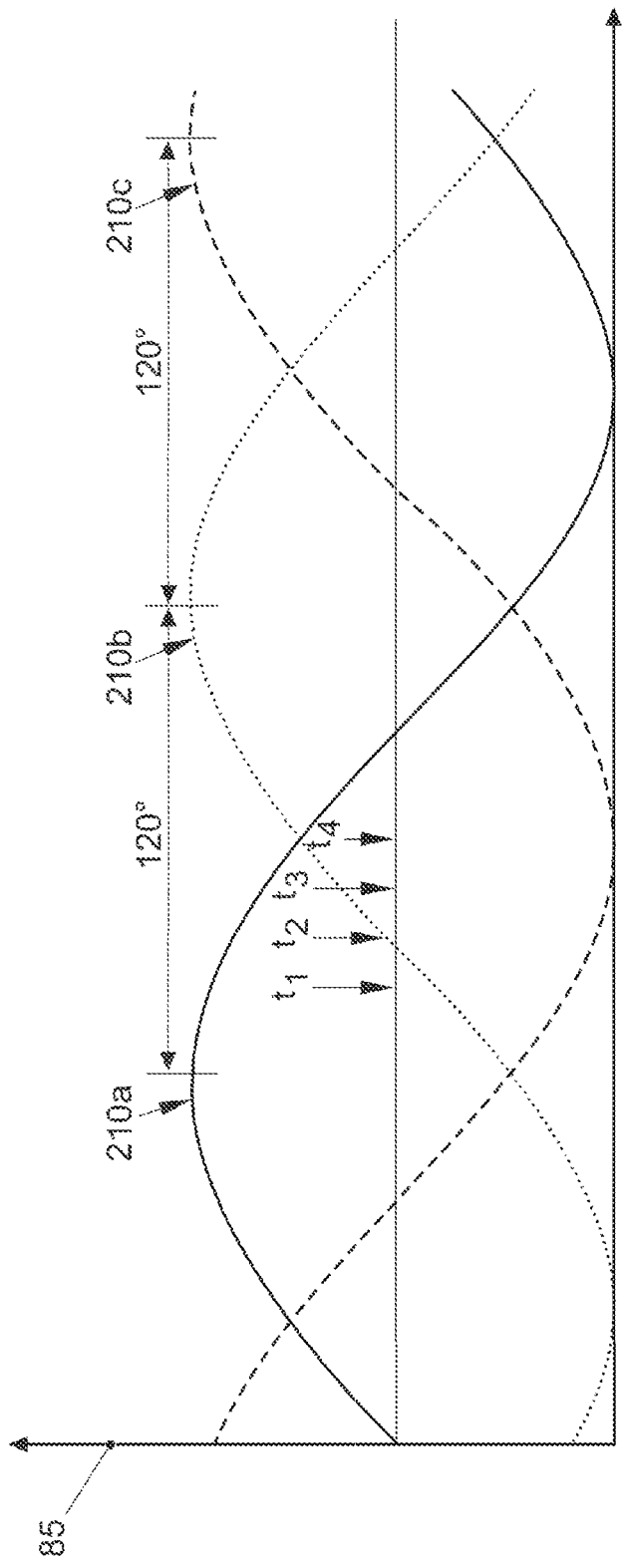

METHOD, CONTROL APPARATUS AND VEHICLE

PRIORITY CLAIM

This patent application is a U.S. National Phase of International Patent Application No. PCT/EP20216/062770, filed 6 Jun. 2016, which claims priority to German Patent Application No. 10 2015 212 782.6, filed 8 Jul. 2015, the disclosures of which are incorporated herein by reference in their entireties.

SUMMARY

Illustrative embodiments relate to a method, a control apparatus and a vehicle. Illustrative embodiments relate to techniques that allow an angular arrangement of a receiver with respect to a transmitter.

BRIEF DESCRIPTION OF THE DRAWINGS

Disclosed embodiments are explained in more detail in connection with the drawings, in which:

FIG. 2A is a plan view of a coil arrangement of FIG. 1, in which one coil is tilted in relation to a coil plane;

FIG. 2B is a side view of the coil arrangement of FIG. 2A;

FIG. 3A shows the phase-shifted energizing of the coils of the coil arrangement of FIG. 1 as a function of time for emitting a rotating electromagnetic field;

DETAILED DESCRIPTION

Figure 1:
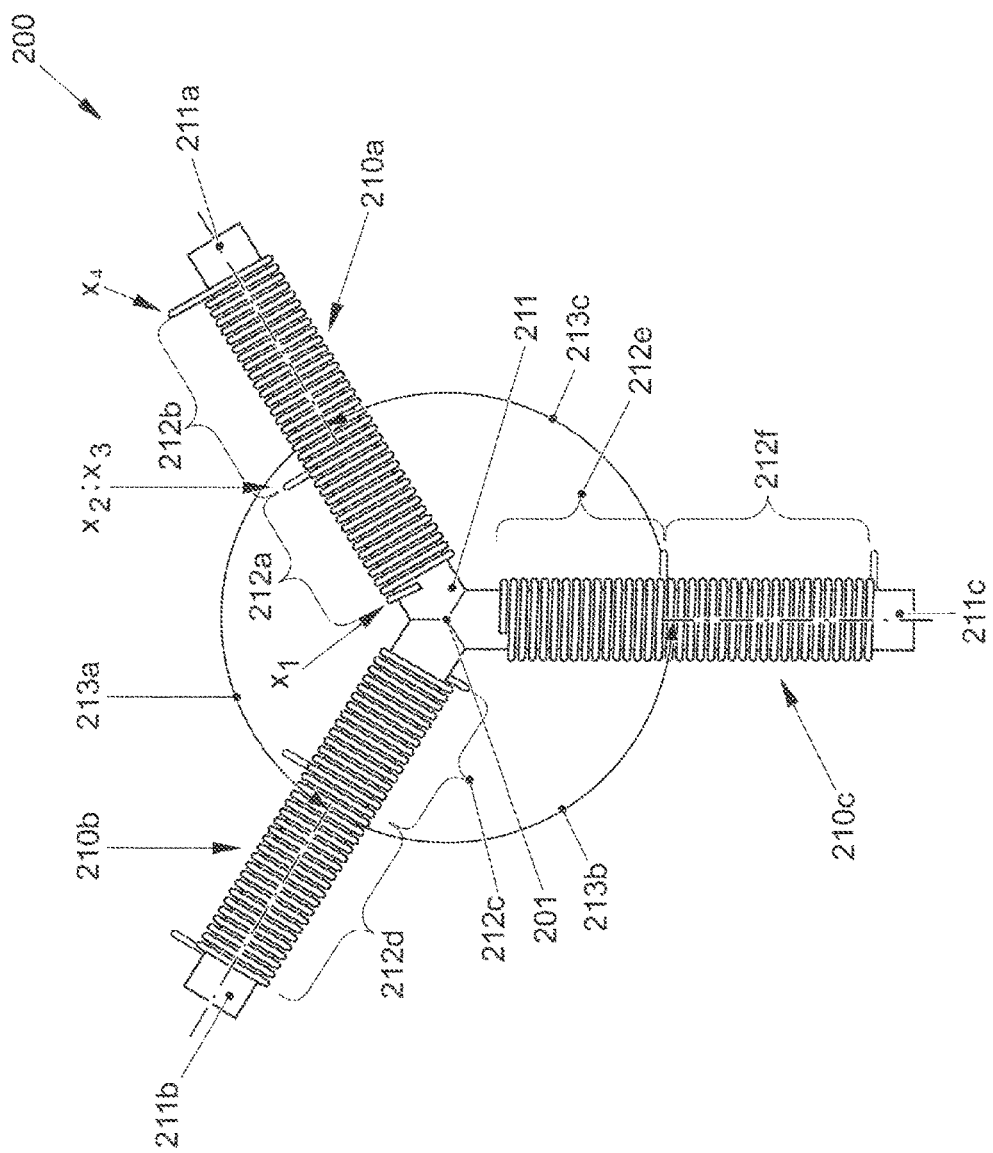
FIG. 1 is a plan view of a coil arrangement for a positioning system, the coil arrangement having three coils, each with two coil windings.

Techniques are known, which allow a location, i.e., a position determination, of, for example, identification transmitters. An example of an identification transmitter would be a key for a vehicle: thus, techniques are known which allow the position of the key in the environment of the vehicle to be determined to obtain access control to the vehicle. This means that, for example, a locked condition of doors of the vehicle can be controlled. Conventional techniques are typically based on measurement of a field strength of an electromagnetic field emitted by a central transmitter. Because the field strength decreases for increasing distances from the transmitter (attenuation or decay of the field strength), from a measurement of the field strength by a receiver antenna in the key, a position with respect to the transmitter can be inferred.

However, such techniques can have a limited accuracy in the determination of the position of the identification transmitter, e.g., due to limited accuracy in the measurement of the field strength. Typical accuracies of the position determination in known systems are, e.g., 10-20 cm. In addition, systematic distortions can occur: in particular, the decrease in the field strength of the electromagnetic field can be disrupted, for example, due to magnetic objects such as the vehicle bodywork, etc., so that the determination of the position of the identification transmitter can be liable to a certain systematic error. Such cases can make it necessary to carry out a one-off manual measurement of the decay in the field strength in and around the vehicle to calibrate the position determination. Such a manual measurement can be time-consuming and can incur corresponding costs. The calibration itself can also introduce sources of error.

In addition, it is possible that although the distance can be determined relatively exactly during the position determination, an angular arrangement of the identification transmitter with respect to the transmitter cannot be determined, or not exactly.

DE 10 2012 017 387 A1 discloses techniques for determining a position of a receiver. To this end, an electromagnetic field is emitted, which rotates relative to a transmitter as a function of time. A differential phase between the electromagnetic field at the position of the receiver and at the position of the transmitter can be used in the position determination. Determining the differential phase may involve relatively high technical effort. For example, it may be necessary to measure the electromagnetic field at the position of the receiver in a time-resolved manner.

For the reasons set out above, there is a demand for improved methods and systems for determining a position of a receiver. There is a need for methods and systems, which enable an exact position determination while at the same time having a low susceptibility to interference with limited technical effort and costs.

At least one disclosed embodiment relates to a method, which comprises activating a transmitter. The activation is effected in such a way that the transmitter emits at least two electromagnetic fields. An amplitude of each of the at least two electromagnetic fields has an anisotropy in one plane. This anisotropy is statically aligned in the plane. The method also comprises obtaining magnetic field measurement data. The magnetic field measurement data indicate the amplitudes of the at least two electromagnetic fields at the position of a receiver. The method also comprises determining an angular arrangement of the receiver relative to the transmitter based on the amplitudes of the at least two electromagnetic fields at the position of the receiver.

For example, the procedure can be executed with a control apparatus, which is connected to the transmitter. For example, it would be possible for the control apparatus to be integrated in the transmitter. The control apparatus can, for example, be part of a positioning system for an identification transmitter for access control to a vehicle.

The at least two electromagnetic fields can be time-varying alternating electromagnetic fields at a specific frequency. The frequency can be, for example, in a range from 100 kHz to 10 MHz, optionally up to 1 MHz, and optionally have a value of 125 kHz or 1 MHz. The transmitter can comprise, for example, an electromagnetic oscillating circuit with an inductance and a capacitor; the person skilled in the art will be aware of relevant techniques which enable an appropriate design of the transmitter for generating these frequencies.

For example, the transmitter can be activated in such a way that the at least two electromagnetic fields are emitted sequentially. The sequential emission of the at least two electromagnetic fields can thus mean: firstly emitting a first electromagnetic field of the at least two electromagnetic fields; followed by emitting a second electromagnetic field of the at least two electromagnetic fields (time-division multiplexing). It would also be possible to use techniques of frequency multiplexing and to emit the at least two fields at least partially temporally overlapping at different frequencies.

The anisotropy can, for example, refer to a dependency of the amplitude of the magnetic field component of the electromagnetic field on an angle in the plane. On the basis of this anisotropy (in contrast to an isotropic dependency), the amplitude can have a non-vanishing dependency on the angle in the plane. This means that the amplitude can vary as a function of the angle in the plane. The presence of the anisotropy means that the angular arrangement of the receiver relative to the transmitter can be determined. This is the case, because depending on the angular arrangement of the receiver relative to the transmitter, the amplitude of the at least two electromagnetic fields can differ at the position of the receiver, due to the anisotropy.

The at least two electromagnetic fields can have different anisotropies. For example, it would be possible that a first of the at least two electromagnetic fields has a first anisotropy in the plane and a second of the at least two electromagnetic fields has a second anisotropy in the plane, the first anisotropy in the plane being different from the second anisotropy in the plane. For example, the first anisotropy could have a point of maximum amplitude at a first angle with respect to the transmitter, while the second anisotropy could have a point of maximum amplitude at a second angle with respect to the transmitter, wherein the first angle and the second angle differ from each other.

Since the anisotropy is aligned in a static (essentially time invariant) manner in the plane, a point of maximum or minimum amplitude, for example, cannot shift, or not significantly, in relation to the position of the transmitter as a function of time. In other words, this can mean that the at least two electromagnetic fields do not or not significantly rotate as a function of time, for example, in the plane in relation to the transmitter.

The magnetic field measurement data can directly or indirectly indicate the amplitudes of the at least two electromagnetic fields at the position of the receiver. For example, it would be possible for the magnetic field measurement data to indicate an rms value of the at least two electromagnetic fields at the position of the receiver. For example, the rms value can be proportional to the amplitude of the at least two electromagnetic fields. It would also be possible, for example, for the magnetic field measurement data to indicate a power density of the at least two electromagnetic fields at the position of the receiver, which, in turn, can be proportional to the amplitude of the at least two electromagnetic fields at the position of the receiver. The specific manner with which the magnetic field measurement data indicate the amplitude can depend on a type of magnetic field sensor used.

For example, the receiver can be configured physically separately from a control apparatus or the transmitter. The receiver can be designed to move freely with respect to the transmitter. In this respect, obtaining the magnetic field measurement data can comprise: wireless reception of the magnetic field measurement data by the receiver over an air interface. For example, the wireless reception can comprise proprietary techniques or technologies, such as WLAN, see IEEE 802.11 standards etc. The wireless reception can comprise e.g., mobile communication technologies, such as 3GPP standardized technologies, such as UMTS, LTE or GPRS. Since the transmitter can be arranged to move freely with respect to the transmitter, it may be the case, for example, that the determination of the angular arrangement is repeated from time to time, e.g., at a fixed repetition rate.

In other words, determining the angular arrangement of the receiver with respect to the transmitter can correspond to determining the orientation of the position of the receiver with respect to the position of the transmitter. An orientation of the receiver with respect to the transmitter (rotation in space, etc.) may be negligible. It is possible that the angular arrangement of the receiver with respect to the transmitter is determined in the plane in which the at least two electromagnetic fields have the anisotropy.

By using the at least two electromagnetic fields which have a statically aligned anisotropy in the plane, it can be possible to determine the angular arrangement of the receiver with respect to the transmitter using relatively simple techniques. It may not be necessary that the magnetic field measurement data indicate the amplitudes of the at least two electromagnetic fields at the position of the receiver in a time-resolved manner, for example, to determine a rotation or phase difference of the at least two electromagnetic fields in the plane. This can allow, for example, a simpler implementation in relation to the receiver used and/or in relation to a computational effort required in comparison to reference techniques.

By sending out at least two electromagnetic fields, their anisotropy statically defined in the plane, it may not be possible or only to a limited extent, on a distance between the receiver and the transmitter back to close. This may be the case, because the amplitude of the at least two electromagnetic fields at the position of the receiver is dependent on (i) the angular arrangement of the receiver with respect to the transmitter and (ii) the distance from the receiver to the transmitter. In different scenarios, it is therefore possible to combine the at least two electromagnetic fields with a further electromagnetic field, on the basis of which it is possible also to determine the distance between the receiver and the transmitter.

In other scenarios, the method may also comprise activating the transmitter in such a way that the transmitter emits an additional electromagnetic field. The amplitude of the additional electromagnetic field can have an anisotropy in the plane, wherein the anisotropy rotates in the plane as a function of time. The method can also comprise obtaining additional magnetic field measurement data. The additional magnetic field measurement data can indicate the amplitude of the additional electromagnetic field at the position of the receiver. The method can also comprise determining a time-averaged value of the amplitude of the additional electromagnetic field at the position of the receiver, based on the additional magnetic field measurement data. The method can also comprise determining a distance between the receiver and the transmitter based on the time-averaged value of the amplitude of the additional electromagnetic field at the position of the receiver.

The additional electromagnetic field can also be designated as a rotating electromagnetic field, because the anisotropy rotates in the plane as a function of time.

Accordingly, the at least two electromagnetic fields, the anisotropy of which is statically aligned in the plane, can also be designated as non-rotating electromagnetic fields.

For example, it would be possible for the method to comprise first of all activating the transmitter to emit the additional electromagnetic field; and then activating the transmitter so that the transmitter emits the at least two electromagnetic fields (Time Division Multiplexing). It would also be possible, however, to use frequency multiplexing, so that the additional electromagnetic field and the at least two electromagnetic fields are emitted such that they at least partially temporally overlap.

The additional electromagnetic field can thus carry out a rotational movement in the plane, which has a certain angular velocity. In this respect, the plane can also be referred to as a rotational plane. In other words, points of equal phase angle, i.e., for example, a maximum or minimum of the field strength of the additional electromagnetic field, can be arranged in different directions or at different angles with respect to the transmitter as a function of time. Figuratively speaking, for example, a maximum of the amplitude can move like the light beam of a lighthouse (here the transmitter). A rotation frequency of the rotary motion can be equal to the frequency of the electromagnetic field itself. it is also possible, however, for the rotation frequency to have other values. The rotary motion of the additional electromagnetic field can be characterized—as is typical of cyclic processes—by a specific phase (phase angle) of the motion; a full rotation can correspond to a cumulative phase of 360° or 2π. The rotating additional electromagnetic field can move, for example, at a constant angular velocity. In general, certain specified dependencies of the angular velocity on the phase (the angle) are possible. For example, it is possible for the rotation plane to be oriented parallel or substantially parallel, i.e., less than, e.g., ±20°, optionally less than ±10°, optionally less than ±2°, with the horizontal, i.e., For example, essentially parallel with the ground. The transmitter can be mounted appropriately for this purpose.

Different types of transmitter can be used. For example, the transmitter can be formed by a coil arrangement, which comprises at least three coils, each of which has a coil axis having a non-vanishing component in the plane. For example, the coil arrangement can have three coils which are arranged in the plane and each being at an angle of 120° to the adjacent coils; in this case the coil plane would be coincident with the plane of rotation.

For example, it would be possible for the additional magnetic field measurement data to indicate the amplitudes of the electromagnetic field at the position of the receiver, already averaged over time.

It is then unnecessary to perform special arithmetic operations in the determination of the time-averaged value. In another scenario, it would be possible, for example, for the additional magnetic field measurement data to indicate the amplitude of the additional electromagnetic field in a time-resolved manner. It is then possible, for example, to perform various arithmetic operations, such as integration, magnitude formation, etc. as part of determining the time-averaged value of the amplitude of the additional electromagnetic field.

The additional magnetic field measurement data can directly or indirectly indicate the amplitudes of the at least two electromagnetic fields at the position of the receiver. In this respect, appropriate techniques can be implemented such as were described above in relation to the magnetic field measurement data, which the amplitudes of the at least two non-rotating electromagnetic fields, the anisotropy of which is statically aligned in the plane.

The magnetic field measurement data and/or the additional magnetic field measurement data can have no dependence on the orientation of the receiver. For example, it would be possible to configure the receiver to provide the magnetic field measurement data independently of the orientation of the receiver. This may mean, for example, that the receiver provides the magnetic field measurement data in such a way that different rotations or orientations of the receiver in space have either no or no significant influence on the way in which the measured amplitudes of the at least two electromagnetic fields are indicated by the magnetic field measurement data. This may mean, for example, that the receiver provides the magnetic field measurement data in such a way that different rotations or orientations of the receiver in space have either no or no significant influence on the way in which the measured amplitude of the additional electromagnetic field is indicated by the additional magnetic field measurement data. In this respect, it would be possible, for example, for the receiver to have a magnetic field sensor with two or three or more magnetic field sensor elements, which have different sensitivities along orthogonal directions in space (x, y, z-direction). The magnetic field sensor elements can then be configured to measure the magnetic field component of the electromagnetic fields. The absolute values of the signals can then be summed across the different magnetic field sensor elements, e.g., after an analog-to-digital conversion. Such a magnetic field sensor elements are often referred to as 3D coils. For example, the magnetic field sensor elements can be implemented using GMR sensor elements (giant magneto-resistance), Hall sensor elements, TMR sensor elements (tunnel magneto-resistance), AMR sensor elements (anisotropy magneto-resistance) or combinations thereof.

The rotary motion of the additional electromagnetic field, can produce a corresponding time dependence of the amplitude or phase angle of the additional electromagnetic field at the location of the receiver. However, by determining the time-averaged value—which has a time constant, for example, in the same order of magnitude or greater than the rotation frequency of the additional electromagnetic field—the time dependence of the amplitude of the additional electromagnetic field must be eliminated. In addition, due to the rotation of the additional electromagnetic field—in spite of the anisotropy of the additional electromagnetic field—the time-averaged amplitude of the additional electromagnetic field at the position of the receiver may have no or no significant dependence on the angular arrangement of the receiver with respect to the transmitter. In any case, by combination of the magnetic field measurement data with the additional magnetic field measurement data, it may be possible in such a way to infer both the distance between receiver and transmitter as well as the angular arrangement of the receiver with respect to the transmitter. Thus, a comprehensive and accurate positioning of the receiver with respect to the transmitter can be performed. It may be possible to perform a comprehensive and accurate determination of the receiver position with respect to the transmitter using only one transmitter. It may be redundant to provide multiple transmitters at different locations.

In other scenarios, the method can comprise: based on the distance between the receiver and the transmitter and the receiver and additionally based on the angular arrangement of the receiver with respect to the transmitter, determining whether the receiver is located inside or outside of a specified surrounding region of the transmitter.

Using these techniques, it can be possible to perform a position determination of the receiver comparatively easily and rapidly. IT can be possible for the position determination of the receiver to be made with a comparatively low accuracy; it may not be necessary to apply a higher accuracy of the position determination of the receiver than is necessary to distinguish an arrangement inside or outside of the specified surrounding region.

If the present techniques are used, for example, with a positioning system of an identification sensor for access control to a vehicle, it can be the case that the specified region corresponds to an interior of the vehicle. In this way, a distinction can be made as to whether the receiver, for example, an identification sensor, such as, for example, a key—is located inside or outside the vehicle. It can thus be ensured that no unwanted locking of the vehicle takes place, despite, for example, the receiver being located inside the vehicle.

For example, it is possible that the activation of the transmitter so that the transmitter emits the additional electromagnetic field comprises: phase-shifted energizing of at least three coils of the transmitter arranged in the plane. For example, the phase-shifted energizing could take account of a structurally defined angular arrangement of the at least three coils in the plane, so that a rotation frequency of the additional electromagnetic field is equal to a frequency of the additional electromagnetic field.

For example, in different scenarios it can be possible for three (four) coils to be arranged at angles of 120° (90°) in a plane, i.e., the coil plane or plane of rotation. However, it can be possible to tilt individual coils out of this plane, for example, by an angle of 20° or 40°, optionally by less than 90°, so that a component of the additional electromagnetic field of the respective coil remains within this plane. If the coils are not arranged at equal angles to the adjacent coil, then a temporal adjustment of the energizing of the coils can compensate for an arrangement that differs from the above-described symmetrical arrangement—where compensate can mean that the rotating additional electromagnetic field moves at a constant angular velocity independently of the geometric arrangements of the coils. Each of the coils can generate a supplementary electromagnetic field, which can therefore be individually modulated. The superposition of the supplementary electromagnetic fields generated by the individual coils can produce the rotating additional further electromagnetic field.

For example, it is possible for the coils to be energized in such a way that the rotating additional electromagnetic field is emitted such that it performs one or two or more rotations, i.e., accumulates phases of $2\pi$, $4\pi$, etc. It is also possible for the coils to be energized in such a way that the rotating additional electromagnetic field is emitted such that it only performs a fraction of an entire rotation, i.e., approximately ¼ rotation or ½ rotation, i.e., it accumulates phases of $\pi/2$ or $\pi$.

In general, techniques for activating the transmitter so that the transmitter generates the rotating additional electromagnetic field are known to the person skilled in the art, for example, from DE 10 2012 017 387 A1, the relevant content of which is incorporated herein by cross-reference.

In general, a very wide range of technologies can be used determining the distance between the receiver and the transmitter, based on the time-averaged value of the amplitude of the additional electromagnetic field at the position of the receiver. In a simple scenario it would be possible, for example, for a single additional electromagnetic field to be emitted and based on the associated additional magnetic field measurement data, the measured time-averaged value of the amplitude to be compared with a lookup table, in which different distances are assigned to different time-averaged values of the amplitude.

In another scenario it is possible, for example, to activate the transmitter in such a way that the transmitter emits the additional electromagnetic field with a time dependence of the transmission power and/or the frequency. For example, a time constant of the time dependence of the transmission power and/or the frequency can be greater than a time constant of the time-averaged value of the amplitude of the additional electromagnetic field. In other words, this can mean that the transmission power or the frequency is varied relatively slowly. For example, in a time range for which the time-averaged value of the amplitude of the additional electromagnetic field is formed, the transmission power or frequency can be substantially constant. In this way, the time-averaged value of amplitude is not corrupted by the time dependence of the transmission power or the frequency.

It would be possible, for example, to activate the transmitter such that the transmission power is increased in steps. For each step, or each setting of the transmission power, it will then be possible to obtain corresponding additional magnetic field measurement data, to determine the associated time-averaged value of the amplitude and, to determine the distance, for example, to compare the respective time-averaged value of the amplitude with a predetermined threshold value. As soon as the time-averaged value exceeds the specified threshold, the corresponding transmission power can be applied to determine the distance between the receiver and the transmitter. A lookup table can be implemented for this also. By emitting the electromagnetic field with the time dependence, for example, by the step-wise increase of the transmission power, the distance between the receiver and the transmitter can be determined exactly. At the same time, the energy needed to determine the distance can be comparatively low. For example, provided that the receiver area is located in close proximity to the transmitter, it is then possible to prevent the additional electromagnetic field from being emitted with an unnecessarily high transmission power.

For example, the method can additionally comprise: determining a transmission power for the at least two electromagnetic fields based on the distance determined between the receiver and the transmitter. The transmitter can be activated in such a way that the transmitter emits the at least two electromagnetic fields with the determined transmission power. The energy consumption can thereby be reduced. For example, it can be ensured that, provided the receiver is located in close proximity to the transmitter—an unnecessarily high transmission power is not used.

For example, the activation of the transmitter so that the transmitter emits two electromagnetic fields can comprise, for each of the at least two electromagnetic fields: energizing a single coil of a plurality of coils of the transmitter or energizing in phase at least two coils arranged in the plane of the transmitter.

Using these techniques, it is possible to use the same transmitter both to emit the rotating additional electromagnetic field and to emit the at least two non-rotating electromagnetic fields. By energizing the at least two coils arranged in the plane of the transmitter in phase, it is possible to emit the respective electromagnetic field with a high transmission power; thus, it can be possible to reliably and accurately determine the angular arrangement of the receiver with respect to the transmitter, even in a range remote from the transmitter.

In general, a very wide variety of techniques can be used to determine the angular arrangement of the receiver with respect to the transmitter at the position of the receiver based on the magnetic field measurement data or the amplitudes of the at least two electromagnetic fields. The techniques can be tailored to the specific anisotropy of the at least two electromagnetic fields in the plane. It may be possible to take into account the qualitative and/or quantitative form of the anisotropy of the at least two electromagnetic fields in determining the angular arrangement.

For example, it would be possible for at least one of the at least two electromagnetic fields to have two degrees of anisotropy. For example, it would be possible, for all of the at least two electromagnetic fields to have two degrees of anisotropy in the plane.

In doing so, the two-degree anisotropy can have, for example, two local maxima of the amplitude under different angles in relation to the transmitter. It would be possible, for example, for the at least two electromagnetic fields to have two degrees of anisotropy in the plane with a 180° periodicity. This may mean that a 180° ambiguity can occur between the amplitudes of the at least two electromagnetic fields. Then, in different scenarios it may be possible that the angular arrangement of the receiver with respect to the transmitter is determined with the 180° ambiguity; i.e., it may not be possible, or only to a limited extent, to distinguish between an angular arrangement in which the receiver is arranged in front of the transmitter (12 o'clock position), and an angular arrangement in which the receiver is arranged behind the transmitter (6 o'clock position).

It is possible for at least one of the at least two electromagnetic fields to have one degree of anisotropy in the plane. The single degree of anisotropy can have, for example, a single local maximum of the amplitude at a given angle in relation to the transmitter. By using the single degree of anisotropy, it is possible to ensure, for example, that the 180° ambiguity mentioned above is either resolved or avoided.

In this respect, it would be possible, for example, for the transmitter to have a number of coils of six or more. For example, it would be possible for several pairs of the plurality of coils adjacent in the plane to include an angle in the range of 30°-90° to each other, optionally an angle of 60° to each other. The six or more coils can be arranged in the plane. Adjacent coils can have a U-shaped or V-shaped arrangement. Adjacent coils can then form a so-called U-magnet. The U magnet has one degree of anisotropy, because the electromagnetic field propagates better along the direction facing out of the opening of the U magnet than along the opposite direction. Such an effect is also known as directivity. The directional effect can be used to obtain the single-degree anisotropy.

In other scenarios, it is also possible for the magnetic field measuring data in each case to index a direction of a magnetic field line of the at least two electromagnetic fields at the position of the receiver, wherein the determination of the angular arrangement of the receiver with respect to the transmitter is additionally based on the directions of the magnetic field lines of the at least two electromagnetic fields.

In this case, the direction of the magnetic field lines can indicate both an orientation of the magnetic field line direction, and a plus direction or a minus direction of the magnetic field line. Taking the direction of the magnetic field line into account enables the 180° ambiguity to be resolved.

In this respect, it may also be possible that acceleration measurement data are obtained, which indicate an orientation of the receiver with respect to a direction of the force of gravity. The determination of the angular arrangement of the sensor with respect to the receiver can be additionally based on the orientation of the receiver with respect to the direction of the force of gravity. In this respect, it would be possible, for example, for the receiver to additionally comprise a gravity sensor element. For example, the gravity sensor element can be implemented by a micromechanical acceleration sensor.

Optionally, it would be possible, for example, for a direction of increasing strength of the magnetic field to be also determined by the receiver. Using all such techniques as described above, in other words by the direction of the magnetic field line, the orientation of the receiver with respect to the direction of gravity and/or by the direction of increasing strength of the magnetic field, it can be possible to resolve the 180° ambiguity.

In A further disclosed embodiment relates to a method. The method comprises activating a transmitter, so that the transmitter emits an electromagnetic field. The amplitude of the electromagnetic field has an anisotropy in one plane. The anisotropy rotates in the plane as a function of time. The method further comprises obtaining magnetic field measurement data. The magnetic field measurement data indicate the amplitude of the electromagnetic field at the position of a receiver. The method further comprises determining a time-averaged value of the amplitude of the electromagnetic field at the position of the receiver, based on the magnetic field measurement data. The method also comprises determining a distance between the receiver and the transmitter based on the time-averaged value of the amplitude of the electromagnetic field at the position of the receiver.

For such a method, effects can be achieved that are comparable to the effects which can be achieved for the method according to the further disclosed embodiment.

A further disclosed embodiment relates to a control apparatus of a vehicle, which is configured to carry out a method according to a further disclosed embodiment.

For such a control apparatus, effects can be achieved that are comparable to the effects which can be achieved for the method according to the further disclosed embodiment.

For example, it would be possible for the control apparatus to be configured to generate a control signal as a function of the angular arrangement of the receiver with respect to the transmitter, which controls a vehicle locking state of at least one of the vehicle doors. For example, the control signal allows an access control to the vehicle to be implemented. For example, the control signal could control a central locking system of the vehicle.

The access control can, alternatively or additionally, also be implemented as a function of the distance between the receiver and the transmitter. The access control could be implemented, for example, as a function of whether the receiver is located inside or outside of the specified surrounding region.

A further disclosed embodiment relates to a vehicle, which according to a further disclosed embodiment comprises the control apparatus. The vehicle additionally comprises the transmitter. For example, the transmitter can comprise at least three coils, which are arranged in the plane.

For example, it would be possible for the access control to the vehicle to be carried out based on the transmitter alone, without the use of additional transmitters. Using a single transmitter means that the access control can be implemented at low cost. System complexity can be reduced.

For such a vehicle, effects can be achieved that are comparable to the effects which can be achieved for the method according to the further disclosed embodiment.

A further disclosed embodiment relates to a vehicle, which comprises a first transmitter and a second transmitter. The vehicle also comprises the control apparatus according to a further disclosed embodiment. The first transmitter can have, for example, at least three coils, which are arranged in a plane. The second transmitter can have, for example, a single coil. For example, the first transmitter can be used to generate the at least two electromagnetic fields discussed above, as well as the additional electromagnetic field discussed above. It would be possible to resolve the 180° ambiguity by the emission of a second electromagnetic field by the second transmitter. The second transmitter can be designed relatively simply, so that costs and installation space can be reduced compared to the first transmitter. For example, it would be possible for the first transmitter and the second transmitter to be located at different positions inside the vehicle.

At least one disclosed embodiment relates to a coil arrangement for generating a rotating electromagnetic field, wherein the coil arrangement comprises at least three coils, each having at least one associated coil winding. The coil arrangement also comprises a ferromagnetic coil yoke, which produces a magnetic coupling between the at least three coils.

The at least one coil winding can itself have a plurality of turns of an electrically conductive wire or conductor tracks. The coils can comprise one or a plurality of coil windings—in other words, if there are multiple coil windings of a coil these can be electrically contacted or tapped separately.

The magnetic coupling can be characterized by a certain magnetic flux, which has, e.g., a certain size. A magnetic flux can be generated, for example, by the continuous connections of the coil yokes. The coil arrangement can be configured such that the magnetic flux in a center of the coil arrangement has a certain value, for example, approximately or exactly 0. For example, the coil yoke can be continuous, thus without or with only a few and/or very small or short interruptions or air gaps. It can be produced from a ferromagnetic material, such as iron, chromium, nickel, oxides of these materials, such as ferrite, alloys of iron, chromium, nickel, and so on. The magnetic coupling can be a ferromagnetic exchange interaction, which is formed across the entire region of the coil yoke.

It is possible that the at least three coils are arranged in a coil plane and that adjacent coils are arranged within the coil plane at angles of approximately 120° apart. For example, adjacent coils can be arranged at angles of 120°±10°, optionally ±5°, optionally ±0.5° apart. It may then be possible to generate the rotating electromagnetic field with a relatively simple activation of the coils (e.g., with AC voltages phase-shifted by 120°). In general, however, other angles, which adjacent coils within the coil plane include with each other are possible. If the coils are arranged within the coil plane, this can mean that the coils (or their central axes) include either no or only a small angle, e.g., ±10°, optionally ±5°, optionally ±1°, with vectors which define the coil plane.

It may be possible, in the case of different angles between adjacent coils within the coil plane, to adapt a phase shift of the AC voltages according to the different angles for activating the various coils, so that a rotating magnetic field is generated which has a constant angular velocity.

It is also possible to use, for example, four or six or more coils, which are arranged in the coil plane at specified angles relative to adjacent coils. Purely for illustrative purposes and without limiting, four (six) coils can be arranged at angles of 90° (60°) apart. Other corresponding symmetrical configurations, in which adjacent coils are always equal angles apart, are possible.

Scenarios have been described above, in which all the coils lie within a coil plane. Such a coil plane can define a plane of rotation of the rotating electromagnetic field. However, other scenarios are also possible in which single coils or a plurality of coils are located outside the coil plane which is defined by at least two coils. In other words, single or multiple coils can be tilted with respect to the coil plane. In such a case also, it is possible that the coil plane defines the plane of rotation.

It is possible that the ferromagnetic coil yoke is arranged continuously within the at least three coils, and that the coil arrangement also comprises at least three capacitors, each of which is connected in series with one of the at least three coils, and a housing having external electrical contacts and mechanical supports. In other words, each coil can be connected in series (series circuit) with one capacitor. The values of the inductance of the coil and the capacitance of the capacitor can then, in a manner known to the person skilled in the art, define a frequency of the respectively generated electromagnetic field. The frequency can be, for example, in a range from 100 kHz to 10 MHz, optionally up to 1 MHz, optionally having a value of 125 kHz or 1 MHz.

It is possible that two or more coil windings are present per coil, each having a number of turns, which can be activated jointly or separately, and that the coil arrangement additionally comprises at least three more capacitors, each of which is connected in parallel with one of the two or more coil windings per coil. Thus, it can be possible to provide a plurality of coil windings in one coil, which are separately electrically contactable, and therefore different inductances. There can therefore be a plurality of resonant circuits available with different resonance frequencies. The coil arrangement can therefore emit electromagnetic fields with different frequencies. In addition, by connecting each of the additional capacitors in parallel with a coil winding, operation of the coil arrangement can be obtained with a comparatively low power consumption, in particular, for a series connection with capacitors. This can have benefits in applications where only a limited energy reservoir is available.

In general, it may be possible for the at least one coil windings of the at least three coils to each have the same geometries and/or turns. In other words, the at least three coils can be of the same type. It may therefore be possible, by a simple energizing process, to generate the rotating electromagnetic field, which has, for example, a constant angular velocity of rotation.

In the above, a coil arrangement having at least three coils was primarily referred to. It is possible to operate a plurality of such coil arrangements in combination as a positioning system for a receiver.

A further disclosed embodiment relates to a positioning system for determining a position of an identification sensor for a vehicle, wherein the positioning system comprises at least one coil arrangement in accordance with another disclosed embodiment, wherein each of the at least one coil arrangements is configured to be operated as a transmitter for at least two electromagnetic fields and an additional electromagnetic field. An amplitude of each of the at least two electromagnetic fields has an anisotropy in one plane. The anisotropy is statically aligned in the plane. The amplitude of the additional electromagnetic field has an anisotropy in the plane, wherein the anisotropy rotates in the plane as a function of time. The positioning system also comprises the identification sensor with a receiving coil, wherein the identification sensor is configured to be operated as a receiver for the at least two electromagnetic fields and the additional electromagnetic field.

For example, the positioning system can be configured to determine the position of the identification sensor in an external area of the vehicle. Alternatively or additionally, the positioning system can be configured to determine the position sensor in an interior of the vehicle.

Thus, for example, a frequency of the reception coil can be tuned to the frequencies of the at least two coil arrangements. For example, three or four coil arrangements can be provided. If more than two coil arrangements are used, these can be mounted such that they are spaced apart from one another. For example, such a positioning system can be configured for carrying out the method in accordance with another disclosed embodiment.

The positioning system can further comprise a control apparatus, which is configured for activating the coil arrangement to emit the respective electromagnetic field in a predefined sequence.

The control apparatus can be, for example, a central processing unit of the vehicle. For example, the control apparatus can be implemented as hardware or software, or a combination thereof, on the central processing unit of the vehicle.

It is possible for the control apparatus to be coupled with the coil arrangements via a bus system and that the coil arrangement is coupled with a supply line, and that the coil arrangement is configured to receive a control signal of the control apparatus via the bus system and to generate the rotating electromagnetic field depending on the control signal, wherein the power for emitting the rotating electromagnetic field is obtained via the supply line.

For example, the coil arrangements could comprise a processing unit as an interface for communication with the control apparatus via the bus system. The processing unit can be configured to receive and process the control signal.

The supply line can be, for example, an on-board power network of a vehicle. The supply line can have, e.g., other current-voltage ratios than that necessary for activating the coils of the coil arrangements to generate the electromagnetic fields. For example, the supply line can provide a 12 V DC voltage. Therefore, the coil arrangements can have a circuit for current to voltage conversion, in other words an AC voltage source. It may thus be possible, for example, to supply the coil arrangement with energy in a decentralized manner for generating the electromagnetic fields. As an effect of this, a simplified system architecture can be achieved, in particular, it may not be necessary to maintain dedicated power supply cables from the control apparatus to the individual coil arrangements. The coil arrangements, in response to an instruction from the control apparatus via the bus system, can selectively extract energy from the on-board network to generate the electromagnetic fields. Typically, supply lines of the on-board network are already available in different sections of the vehicle, so that no major structural changes may be necessary.

The above described features, and features which are described below, can be used not only in the relevant combinations explicitly described, but also in other combination or in isolation, without departing from the scope of protection of the present disclosure.

Hereafter, the disclosed embodiments are described in greater detail with reference to the drawings. In the figures, identical reference numerals designate identical or similar elements. The figures are schematic representations of different embodiments. Elements in the figures shown are not necessarily shown to scale. Rather, the different elements shown in the figures are reproduced in such a way that their function and general purpose are understandable to the person skilled in the art. Connections and couplings between functional units and elements shown in the figures can also be implemented as an indirect connection or coupling. A connection or coupling can be implemented in a wire-bound or wireless manner. Functional units can be implemented as hardware, software, or a combination of hardware and software.

In the following, techniques are described which enable an angular arrangement of a receiver with respect to a transmitter to be determined based on the amplitudes of at least two electromagnetic fields at the position of the receiver. In this case, the at least two electromagnetic fields are emitted in such a way that they have an anisotropy in a plane, which in each case is statically aligned in this plane. For this reason, in the following, the at least two electromagnetic fields are also referred to as non-rotating electromagnetic fields.

Alternatively or in addition, it is possible to determine the distance between the receiver and the transmitter. This can take place based on a time-averaged value of the amplitude of an additional electromagnetic field at the position of the receiver. In this case, the additional electromagnetic field is emitted in such a way that it has an anisotropy in the plane, which rotates in the plane as a function of time. For this reason, in the following the additional electromagnetic field is also referred to as a rotating electromagnetic field.

In general, a very wide range of transmitters can be used to generate the non-rotating electromagnetic fields and the rotating electromagnetic field. The same transmitter can be used to generate the non-rotating electromagnetic fields and the rotating electromagnetic field. To emit the non-rotating electromagnetic fields and the rotating electromagnetic field, a coil arrangement, for example, can be used as a transmitter. The coil arrangement can comprise a plurality of coils, which are arranged in the plane. By increasing the current flow through the coils of the coil arrangement, the transmission power can be increased. It may thus be possible to increase the distance within which the angular arrangement and/or the distance can still be determined (measuring range). The measuring range can also be increased by the non-rotating and/or the rotating electromagnetic fields being emitted at frequencies which have a low decay rate.

The determination of angular arrangement and/or distance from the receiver to the transmitter is also designated as position determination of the receiver. It is therefore possible, by a combination of the non-rotating electromagnetic fields with the rotating electromagnetic field, to perform a comprehensive position determination of the receiver in relation to the transmitter. In this case, the position determination can take place with a certain level of accuracy; this accuracy can be larger or smaller depending on the scenario considered. For example, in different scenarios with low accuracy, it may be sufficient if the angular arrangement can only be determined with a 180° ambiguity. In other scenarios with high accuracy, the angular arrangement can be determined uniquely, i.e., without 180° ambiguity. In various scenarios with low accuracy, for example, it may be sufficient to determine whether the receiver is inside or outside a specified surrounding region of the transmitter.

It can be possible to locate the position of the receiver in a polar coordinate system. For this purpose, the distance r can be angle-independent by phase-shifted energizing of a plurality of coils of the coil arrangement. This can be combined, for example, with the step-wise increase of the transmission power. The transmission power can be increased until the receiver detects a suitable reception field strength or amplitude, for a good utilization of the modulation range of a magnetic field sensor. The angle α of the angular arrangement can be determined by the a-dependent reception field strength or amplitude of the non-rotating magnetic fields at the position of the receiver when a single coil of the coil arrangement is energized and/or two or more coils of the coil arrangement are energized in the same phase.

The techniques of position determination of the receiver typically have no dependence on the orientation of the receiver; for example, it may not matter how the receiver is rotate/tilted in space. The receiver can be specifically designed for this purpose, e.g., as a 3D coil.

It may be possible using the techniques described herein to determine the angular arrangement of the receiver with respect to the transmitter very precisely. For example, the angular arrangement can be determined within an uncertainty range of +/−10°. This accuracy can be increased further by, for example, by performing error-correction calibration measures. Suitable calibration, for example, can be used to reduce the effect that ferromagnetic materials in the region between the transmitter and the receiver have on the measurement. In general, the position determination can be carried out in various scenarios with a lower accuracy than in other scenarios; for example, in a simple scenario it would be possible to determine the position with a comparatively low accuracy by only distinguishing between the presence/absence of the receiver in a given surrounding region of the transmitter.

FIG. 1 shows a plan view of a coil arrangement 200, which comprises three coils 210a, 210b, 210c. This coil arrangement 200 can be used to generate the rotating electromagnetic field and the non-rotating electromagnetic fields. The coil 210a has two coil windings 212a, 212b. The coil 210b has two coil windings 212c, 212d. The coil 210c has two coil windings 212e, 212f. The coil windings 212a-212f are each wound around one of three arms 211a, 211b and 211c of a ferromagnetic coil yoke 211 and can be separately electrically contacted. The coil yoke can, for example, consist of iron, nickel, chromium, oxides or alloys of these materials. The arms 211a, 211b and 211c have a circular cross-section and are therefore cylinder-shaped. You can have a diameter of 3 mm-30 mm, optionally of 6 mm. The shape of the arms is variable. They extend radially from a center of the coil arrangement 200. The coil yoke is continuous and therefore has no major gaps or breaks—a magnetic coupling can therefore be built up (as a ferromagnetic exchange interaction, which creates a large magnetic flux) between the 3 coils 210a, 210b, 210c. Depending on the desired inductance (and therefore the frequency of the electromagnetic field), a different number of windings can be selected.

The magnetic flux can assume different values at different points of the coil arrangement 200. By varying the structure of the coil arrangement 200 these values can be specified. For example, in the center of the coil arrangement 200 the magnetic flux can assume a value of zero or close to zero, i.e., a very low value.

As can be seen from FIG. 1, the coils 210a, 210b, 210c all lie in a plane. In FIGS. 2A and 2B an alternative implementation is shown, in which the coil 210c is tilted at an angle β in relation to this plane (coil plane). This can result in a small size of the coil arrangement in the coil plane 200. The angle β can be, for example, in a range from 20°-30°.

Referring again to FIG. 1, the coil 210a includes an angle 213a with the coil 210b. The coil 210b includes an angle 213b with the coil 210c. The coil 210c includes an angle 213c with the coil 210a. These angles 213a, 213b, 213c each extend within the coil plane. In the implementation of FIG. 1 these angles 213a, 213b, 213c assume equal values, namely 120°. In other words, the coil arrangement 200 of FIG. 1 has a star-shaped configuration. While in FIG. 1 a highly symmetric implementation is shown, in general, however, it is possible for the different angles 213a, 213b, 213c to assume different values—which can be desirable if a design of the coil arrangement 200 is subject to certain limitations due to structural constraints. The angles 213a, 213b, 213c are not limited and can assume a very wide range of values. For example, the angles 213a-213b-213c could assume the following values respectively: 180°-90°-90°; 200°-80°-80°, 160°-100°-100°.

As shown in FIGS. 2A and 2B, individual coils 210c can be tilted out of the coil plane. This allows the lateral dimensions of the coil arrangement 200, i.e., the dimensions within the coil plane defined by the coils 210a, 210b, to be reduced. However, since a component of the time-dependent electromagnetic field generated by the coil 210c is still within the coil plane, using the coil arrangement 200 of FIGS. 2A and 2B an electromagnetic field can be generated, which is comparable with the electromagnetic field of the coil arrangement 200 of FIG. 1.

While in each of FIGS. 1, 2A, 2B cases are shown in which the coil arrangements 200 comprise three coils 210a, 210b, 210c, it is thus generally possible to use more coils. For example, an implementation is conceivable in which the coil arrangement 200 comprises four (six) coils, each of which include an angle of 90° (60°) to each other within the coil plane. In the scenario of FIG. 1, the coil arrangement 200 comprises a set of three coils 210a, 210b, 210c; in general, it is possible that the coil arrangement 200 has a larger number of coils, for example, six coils. In such an implementation, it is possible for several pairs of the plurality of coils adjacent in the plane to have an angle in the range of 30° to 90° relative to each other, optionally an angle in the region of 60° to each other. Pairs of coils of the plurality of coils that are adjacent in the coil plane can hence be arranged in a U-shape and form a U-magnet; the U-magnet can generate an electromagnetic field with directivity.

Up to now, reference has mainly been made to structural characteristics of the coil arrangement 200. In the following it will be explained how by using such coil arrangements 200 it is possible to generate the rotating electromagnetic field and to generate the non-rotating electromagnetic fields. The rotating electromagnetic field is generated by a phase-shifted superposition of the electromagnetic fields emitted by the individual coils 210a, 210b, 210c. The rotating electromagnetic field here can designate such a field in which points of equal phase of the electromagnetic field as a function of time rotate around the coil arrangement 200 (for example, its center point 201, see FIG. 1). Accordingly, the rotating electromagnetic field can designate such a field in which points of equal amplitude as a function of time rotate around the coil arrangement 200; this can be synonymous with a rotation of the anisotropy of the electromagnetic field.

For producing the non-rotating electromagnetic fields and the rotating electromagnetic field, the coils 210a-210c are activated together with a capacitor (not shown in FIGS. 1-3) as a resonant circuit.

Referring to FIG. 3A an implementation will be first discussed in which the whole set of coils 210a, 210b, 210c of the coil arrangement 200 of FIG. 1, i.e., the coil windings 212a, 212b and 212c, 212d and 212e, 212f combined, are energized. This generates the rotating electromagnetic field. FIG. 3 shows a plot of the current flow 85 through the coils 210a, 210b, 210c as a function of time. Such a current flow can be obtained by an appropriate AC voltage. As can be seen from FIG. 3, the AC voltages/current flow 85 have a phase difference of 120°—thus corresponding to the angles 213a, 213b, 213c. In other words, the coils 210a, 210b, 210C are energized in a phase-shifted manner. The AC voltage 85 can be generated, for example, by a current-voltage converter, which connects the coil arrangement 200 to a 12 V DC power supply of a vehicle. The AC voltage 85 can then be applied to the innermost and outermost contacts of an arm associated with the respective coil 210a-210c. The current flow shown in FIG. 3A causes the resulting electromagnetic field to rotate.

Figure 3B:
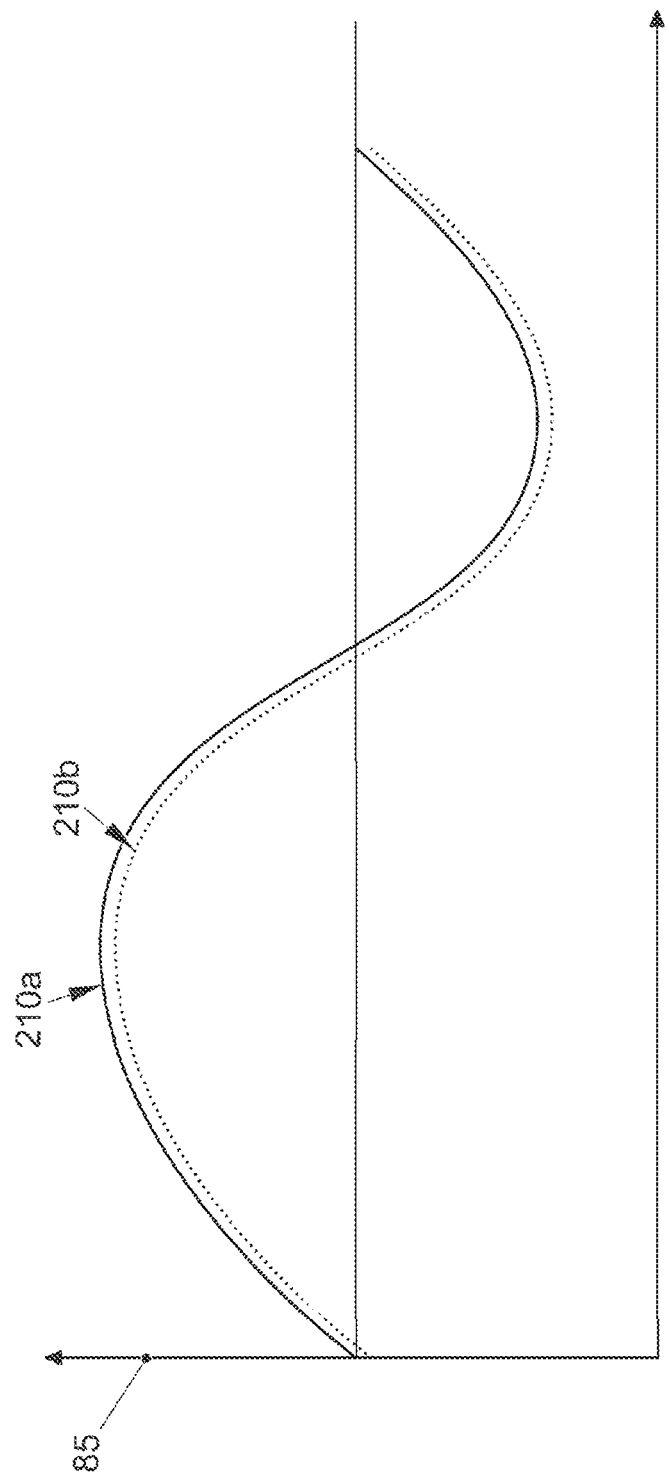
FIG. 3B shows the in-phase energizing of the coils of the coil arrangement of FIG. 1 as a function of time for emitting a non-rotating electromagnetic field.

FIG. 3B shows a scenario in which the resulting electromagnetic field has an anisotropy in the coil plane, which is statically arranged; that is, the resulting electromagnetic field does not rotate. From FIG. 3B, it can be seen that the coils 210a, 210b are energized in phase for this purpose. Alternatively, it would be possible, for example, for only one of the coils 210a, 210b, 210c to be energized.

Figure 4:
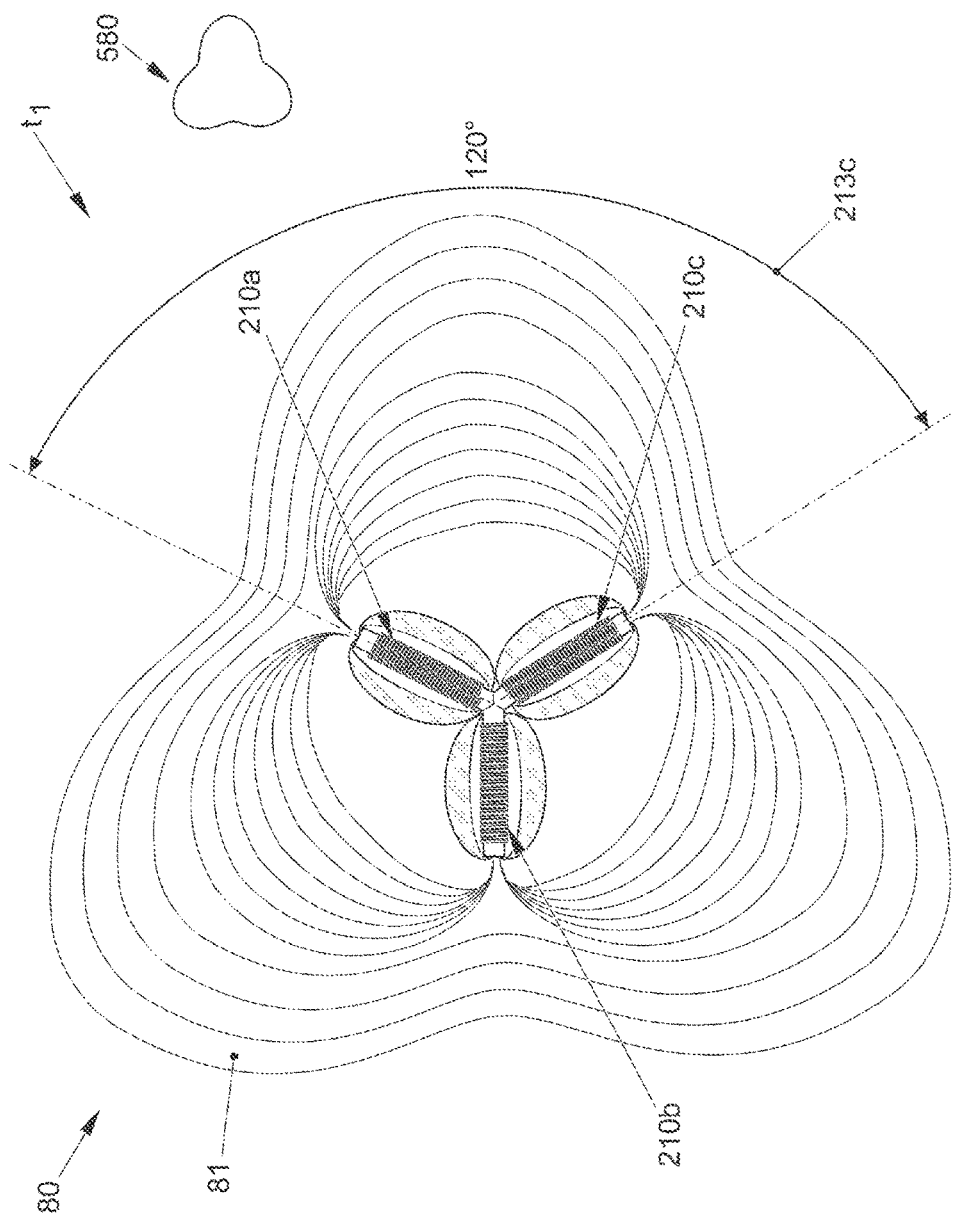
FIG. 4 is an iso-contour plot of the amplitude of the magnetic field component of the rotating electromagnetic field generated by the coil arrangement of FIG. 1 when energized in accordance with FIG. 3A at a particular point in time, also showing an anisotropy of the rotating electromagnetic field.

Energizing the coils 210a, 210b, 210c according to FIG. 3A therefore causes the rotating electromagnetic field 80 to be emitted, as is characterized by the amplitude 81 of the magnetic field component plotted in FIG. 4 (in FIG. 4, in particular, magnetic field lines are plotted). FIG. 4 shows the rotating electromagnetic field 80 at the time t1 (the rotation is not visible). The amplitude of the rotating electromagnetic field 80 has a symmetry corresponding to that of the coil arrangement. The rotating electromagnetic field 80 has three degrees of anisotropy 580; points of maximum amplitude are arranged centrally between adjacent coils 210a, 210b, 210c. The anisotropy 580 has a 120° periodicity. The plot of FIG. 4 represents the rotating electromagnetic field 80 within the coil plane.

It should be clear that it is also possible to generate a rotating electromagnetic field 80 equal to the one plotted in FIG. 4 with other configurations of the coil arrangement 200, which are different to that shown in FIG. 1. If, for example, the angles 213a-213c of adjacent coils 210a, 210b, 210c are different to those 120 of FIG. 1, then the AC voltage 85, in particular, a phase shift, can be adjusted accordingly (see FIG. 3). This allows the modification of the adjacent angles 213a, 213b, 213c to be compensated and a situation similar to that shown in FIG. 4 to be maintained. The same applies if, as illustrated in FIG. 2, individual coils 210c are tilted out of the coil plane. In this case, it may be possible to take into account the projection of the corresponding coil 210c in the coil plane.

Figure 5:
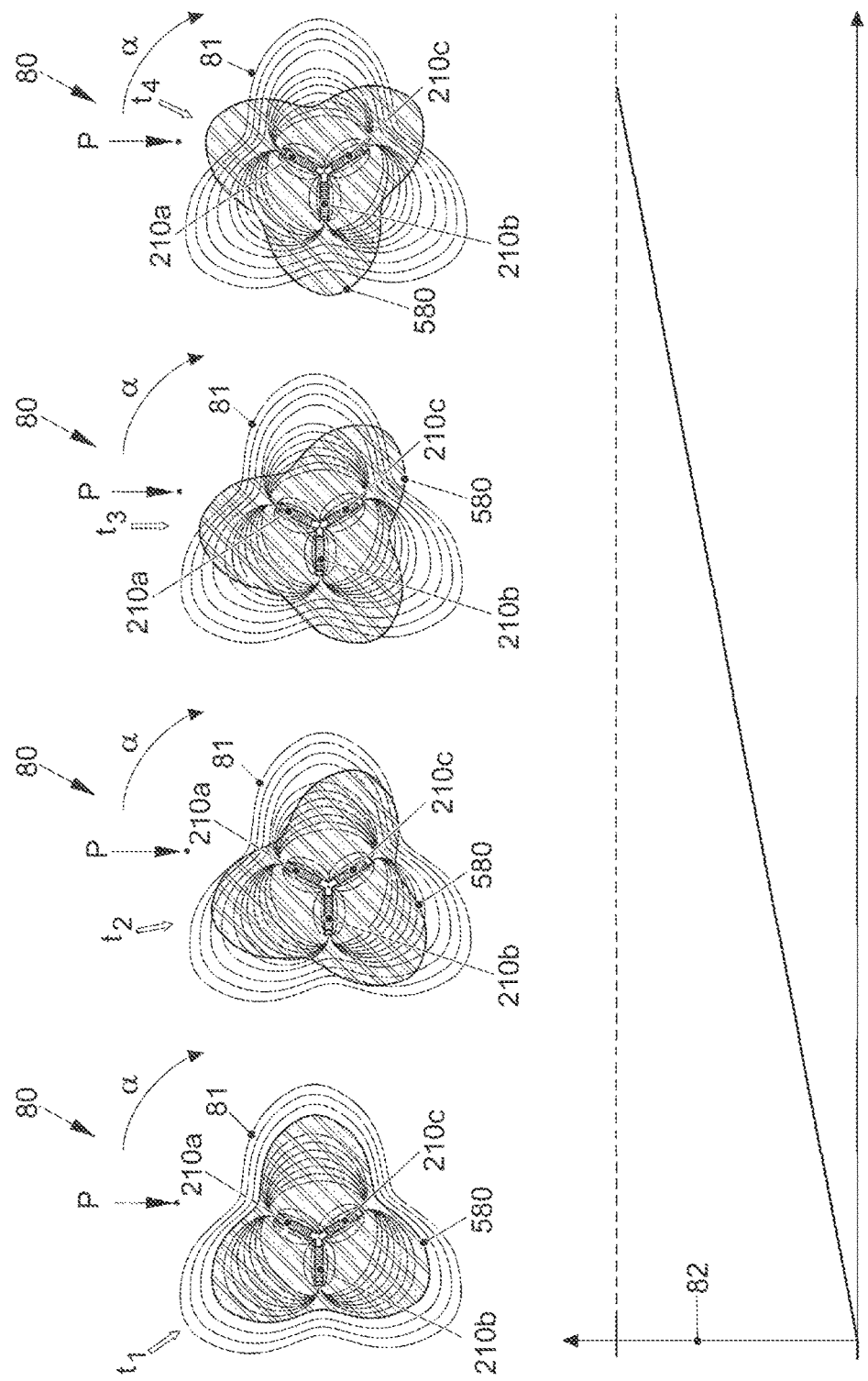
FIG. 5 illustrates the rotation of the anisotropy of the rotating electromagnetic field in accordance with FIG. 4 in a plane of rotation.

By reference to FIG. 5, the rotation of the anisotropy 580 of the rotating electromagnetic field 80 as a function of time will now be discussed. The rotating electromagnetic field 80 is shown at four different time points t1, t2, t3, t4 (see also FIG. 3A'). At the bottom in FIG. 5, the phase 82 of the rotating electromagnetic field 80 is also plotted. An increase in the phase 82 with increasing time is visible (phase accumulation). As can be seen from FIG. 5, the anisotropy 580 of the rotating electromagnetic field 80 rotates about the coil arrangement 200 within the coil plane. The coil plane is therefore coincident with the plane of rotation. While in FIG. 5 a situation is shown in which the rotating electromagnetic field 80 has a constant amplitude as a function of the angle/phase, the amplitude 81 of the rotating electromagnetic field 80 can also, for example, depending on the design of the coil arrangement 200—depend on the phase. A suitable visual analogy to the mode of operation of the coil arrangement 200 for generating the rotating electromagnetic field 80 is that of the three-phase motor.

Figure 6:
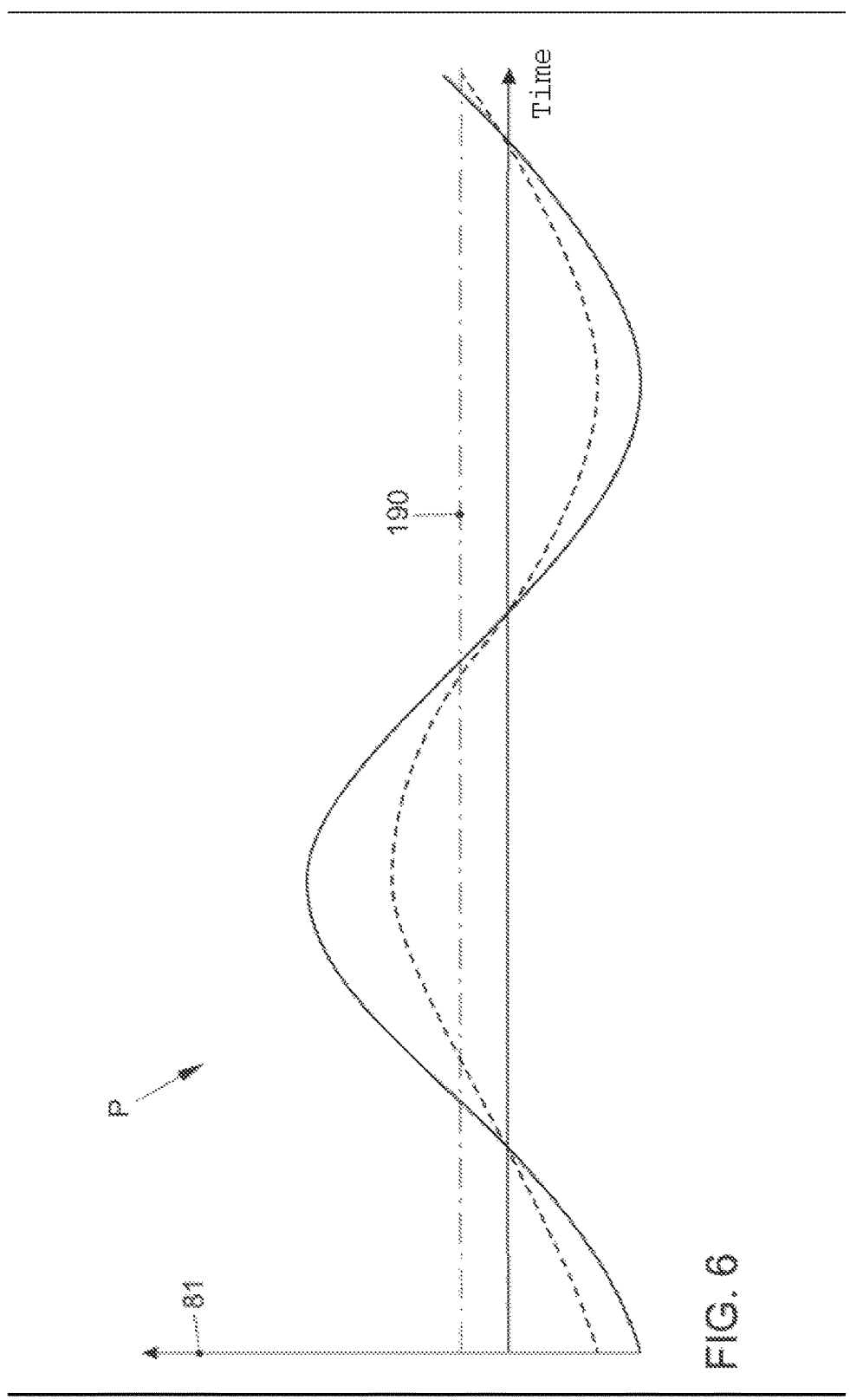
FIG. 6 shows a measured amplitude of the magnetic field component of the rotating electromagnetic field in accordance with FIG. 4 at points a distance apart from the transmitter inside and outside of the plane of rotation as a function of time.

In FIG. 6, as an example a measurement of the amplitude 81 of the magnetic field component of the rotating electromagnetic field 80 is plotted at a point P (see also FIG. 5) in the outer region of the coil arrangement 200 and within the plane of rotation. FIG. 6 also shows a measurement of the amplitude 81 for a point V (dashed line), which is spaced apart from the plane of rotation and the projection of which in the plane of rotation is coincident with the point P. The difference in the amplitude 81 between points P and V is a measure of the distance from point V to the plane of rotation. The amplitude 81 is proportional to a field strength of the rotating electromagnetic field 80. As can be seen, the amplitude varies sinusiodally (solid line).

The measurement of FIG. 6 is not dependent on the orientation of the receiver in space. The receiver has a 3D coil for this purpose, which provides combined measurements along all spatial directions.

The measured amplitude 81 can be described by the function:

$$x(t)=A\sin(2\pi f\,t). \quad (1)$$

where A denotes the amplitude 81, f the rotation frequency and t the time.

For example, the amplitude 81 in magnetic field measurement data can be transmitted by the receiver to a control apparatus, for example, wirelessly.

It is possible to determine the time-averaged value 190 (dashed-dotted line) based on the amplitude 81. In the scenario of FIG. 6, the time-averaged value 190 is determined as a root mean squared value:

$$\tilde{x}=A/\sqrt{2} \quad (2)$$

The time-averaged value 190 does not depend on the angular arrangement of the point P relative to the coil arrangement 200.

In different scenarios, it is possible to directly measure the root mean square value. Even in this type of scenario, magnetic field measurement data can be obtained, which because of the relation in the above equation 2 are indicative of the amplitude 81 of the rotating electromagnetic field 80.

While in relation to Eq. 2 the root mean squared value is taken as a time-averaged value of the amplitude, in general, a different type of time averaging can be performed.

Figure 7A:
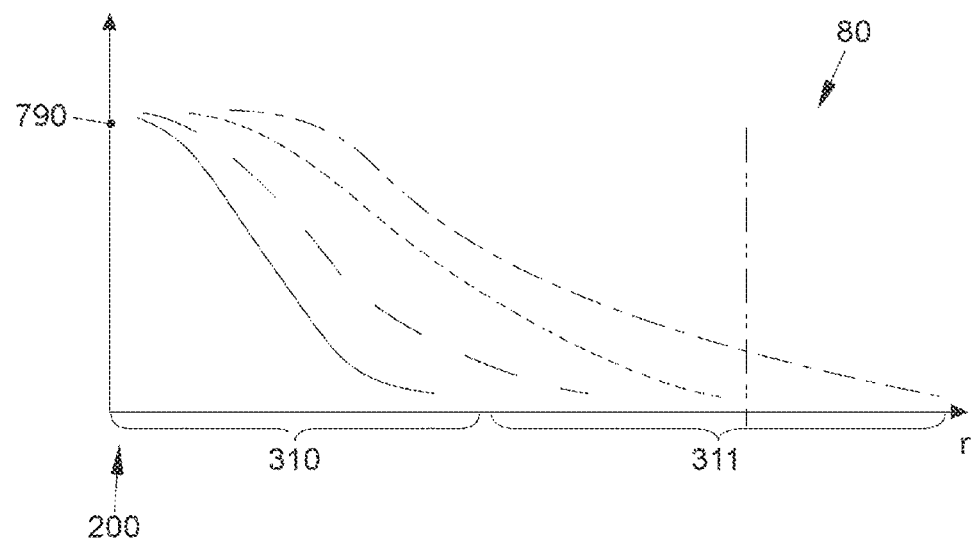
FIG. 7A shows a decay rate of a time-averaged value of the amplitude of the rotating electromagnetic field for increasing distance to the transmitter at different transmission powers.

Based on the measured amplitude 81 or based on the root mean squared value 190 it is then possible to determine the distance between the receiver and the coil arrangement 200. Disclosed embodiments of the determination of the distance based on the root mean squared value 190 are shown in relation to FIG. 7a. FIG. 7A shows the root mean squared value 190 as a function of the distance r between the receiver and the coil arrangement 200 for different transmission powers (solid line, dashed line, dotted line, dashed-dotted line; ordered from low to high transmission power). From FIG. 7A, it can be seen that the root mean squared value 190 decreases with increasing distances r. In a surrounding region 310, which is centered about the coil arrangement 200, in general a larger root mean squared value 190 is therefore measured than in a far range 311.

The root mean squared value 190, which is measured by the receiver at the position P, does not depend on the specific orientation of the receiver. This is partly due to the fact that the rotating electromagnetic field 80 is used, wherein the time-averaged value 190 eliminates a dependency of the amplitude 81 on the angular arrangement of the receiver in relation to the coil arrangement. In so doing, the time-averaged value 190 can be formed, for example, by averaging over more than one period of the rotation of the rotating electromagnetic field 80; in other words, a time constant of the time-averaged value can be greater than a time constant of the rotation of the rotating electromagnetic field 80. The distance r—for a given transmission power—can be determined by measuring the root mean squared value 190; the specific orientation of the receiver in relation to the coil arrangement does not affect the determination of the distance r.

Figure 7B:
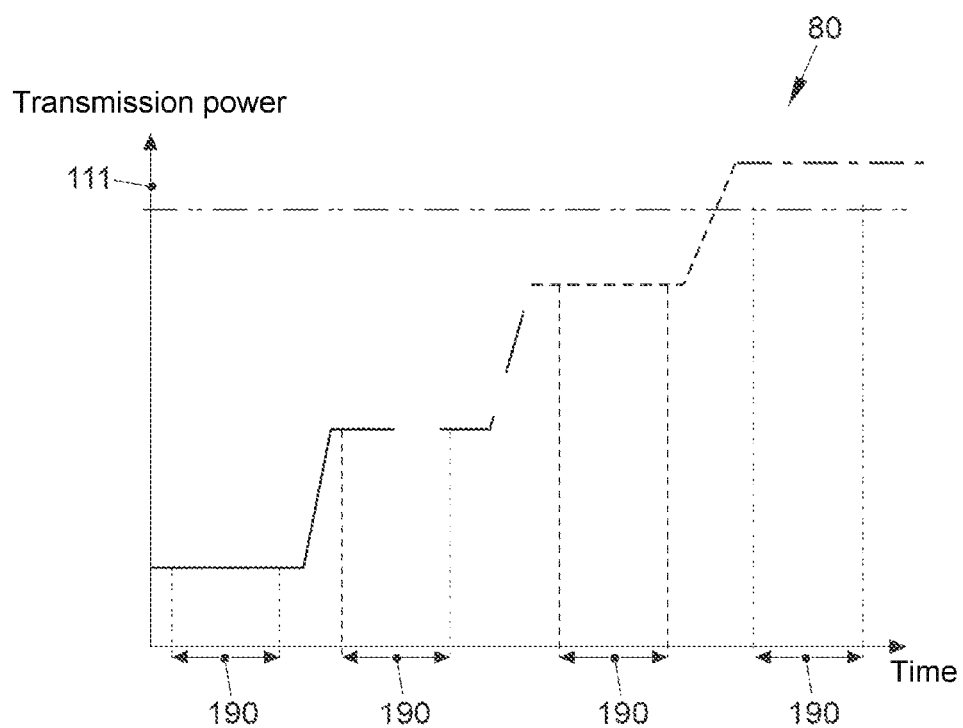
FIG. 7B shows the step-wise increase of the transmission power of the rotating electromagnetic field as part of a corresponding time dependence.

FIG. 7B shows additional embodiment in relation to determining the distance r based on the time-averaged value 190 of the rotating electromagnetic field 80. FIG. 7B shows embodiments that are based on activating the coil arrangement 200 in such a way that the coil arrangement 200 emits the rotating electromagnetic field 80 with a time dependence of the transmission power 111. As can be seen from FIG. 7B, the coil arrangement 200 is activated in such a way that the transmission power 111 is increased gradually. For example, the transmission power 111 can be gradually increased until such time as the measured time-averaged value 190 of the amplitude 81 at the position of the receiver exceeds a given threshold (dashed-dotted-dotted line). Proceeding in this way avoids, for scenarios in which the receiver is in the environment 310 close to the receiver, high transmission powers 111 being used. The energy consumption can thus be reduced.

From FIG. 7B it is also evident that the time constant of the time dependence of the transmission power 111 is longer than a time constant of the time-averaged value 190 of the amplitude 81 of the rotating electromagnetic field 80. This means that during the calculation to determine the time weighted average 190, the transmission power 111 remains substantially constant.

From FIGS. 7A and 7B it is evident that with only a single coil arrangement 200, it is possible to determine the distance r between the coil arrangement 200 and the receiver.

Figure 8A:
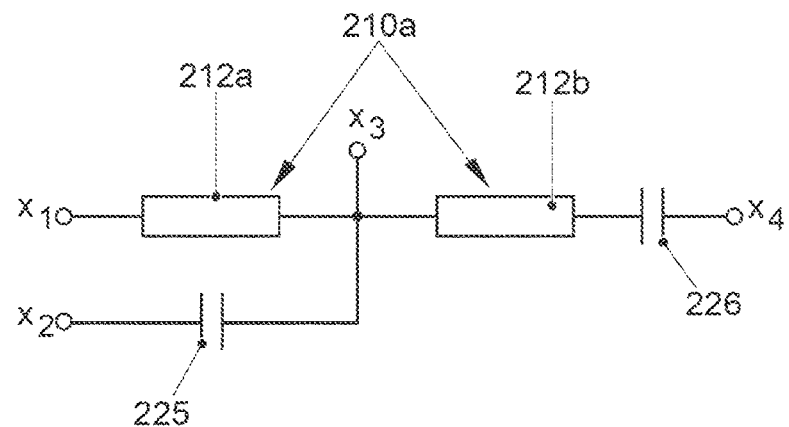
FIG. 8A shows an electrical circuit of a coil comprising two coil windings and two capacitors.

FIG. 8A shows an electrical circuit diagram of the coil 210a of the coil arrangement 200. The two coil windings 212a, 212b are clearly shown. The two coil windings 212a, 212b can be operated in a coupled mode by contacting at the contacts x1 and x4 (see also FIG. 1) A capacitor 226 is connected in series with the two coil windings 212a, 212b. However, it is also possible to operate the coil windings 212a alone. This requires an additional capacitor 225 connected in parallel with the coil winding 212a.

In the case in which the coil windings 212a, 212b are operated in a coupled mode, an inductance of the coil 210a is greater than when only the coil winding 212a is operated. Therefore, a resonance frequency for the former case can be less than a resonance frequency for the latter case. For example, when the coil 210a is operated with the two coil windings 212a, 212b, by appropriate dimensioning of the inductances and the capacitance of the capacitor 226, the resonance frequency can be chosen in such a way that it equals 125 kHz. Accordingly, a resonance frequency for an operation of the coil 210a, which comprises only the coil 212a and the other capacitor 225, can be chosen to be equal to 1 MHz. It is of course possible to generate other frequencies by appropriate dimensioning of the capacitances and inductances. The person skilled in the art has knowledge of a variety of techniques to achieve this.

In general, a power consumption during emission of an electromagnetic field for the series circuit with capacitor 226 can be greater than for the parallel connection with the other capacitor 225. In certain applications, such as searching the environment of a receiver in the far range 311. The activation of the parallel connection with the other capacitor 224 at optionally 1 MHz can emit, for example, an additional non-rotating electromagnetic field. Such a scenario is characterized by the low electrical power consumption, which can be optional, for example, for proximity detection in the far range 311. If the identification sensor 30 in the far range 311 is detected, then the series circuit with the capacitor 226 can be activated. In this operating mode, the distance and the angular arrangement of the identification sensor 30 in the surrounding region 310, for example, up to 3 meters away from the coil arrangement 200, can be determined based on techniques such as those described above. Such a hierarchical operation can result in a lower energy consumption, which can be desirable in electric vehicles.

Figure 8B:
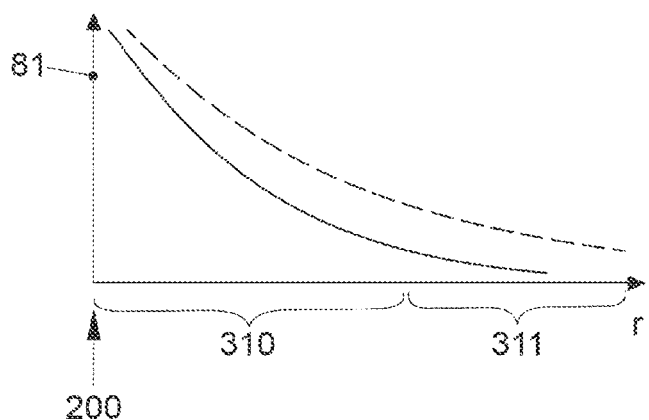
FIG. 8B shows a decay rate of the amplitude of the electromagnetic field for different operating modes of the electrical circuit of FIG. 8A, or for increasing distance to the transmitter at different frequencies.

In a frequency range which includes the above mentioned frequencies, the decay rate of the rotating electromagnetic field 80 can be dependent on the frequency. Thus, higher frequencies can result in a lower decay rate of the rotating electromagnetic field 80. This is illustrated in FIG. 8B. In FIG. 8B the amplitude 81 of, for example, the magnetic component of the rotating electromagnetic field 80 is plotted as a function of the distance r from the emitting coil arrangement 200. The solid (dashed) line illustrates the case of a comparatively low (high) resonant frequency of the corresponding resonant circuit, as discussed above in relation to FIG. 8A. As can be seen from FIG. 8B, a decay rate of the rotating electromagnetic field 80 is lower for higher resonant frequencies. Therefore, by energizing only one (both) of the coils 212a (212a, 212b), it is possible to determine the position of the receiver 30 in a far range 311 (near range 310) of the coil arrangement 200. Appropriate techniques for changing the decay rate by varying the frequency can be used in combination with the variation of the transmission power 111 as was described above in relation to FIG. 7B, to determine the distance r between the receiver and the coil arrangement. It is also possible to use similar techniques to determine the angular arrangement of the receiver with respect to the coil arrangement 200.

Figure 8C:
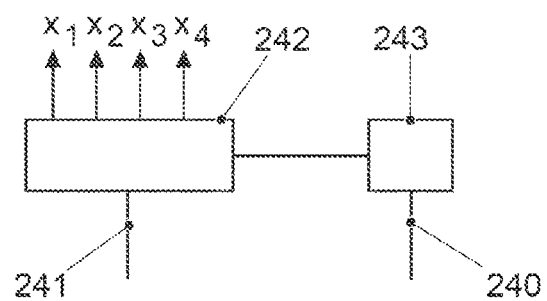
FIG. 8C schematically illustrates an AC voltage source, which is connected to an on-board network and to the coils of the coil arrangement.
Figure 9A:
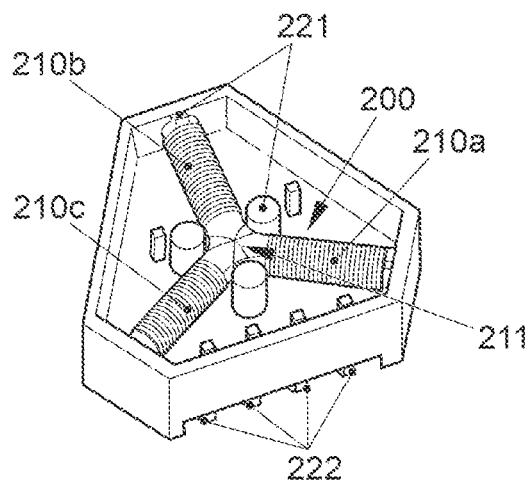
FIG. 9A is a perspective view of the coil arrangement of FIG. 1 in a housing.
Figure 9B:
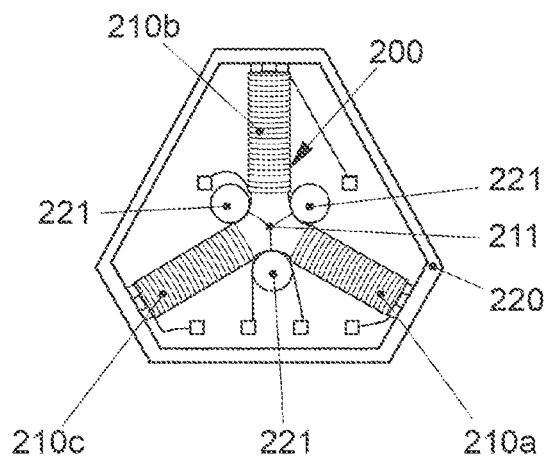
FIG. 9B is a plan view from above of the coil arrangement with housing of FIG. 9A.
Figure 9C:
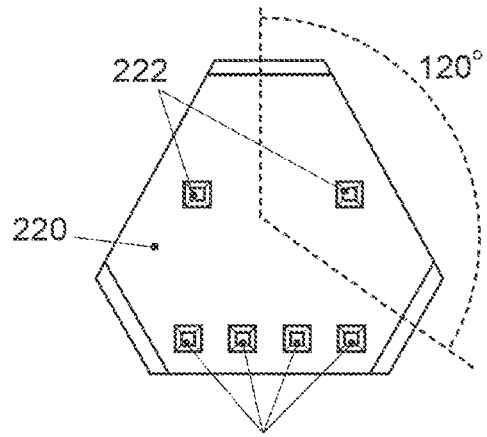
FIG. 9C is a plan view from below of the coil arrangement with housing of FIG. 9A.
Figure 9D:
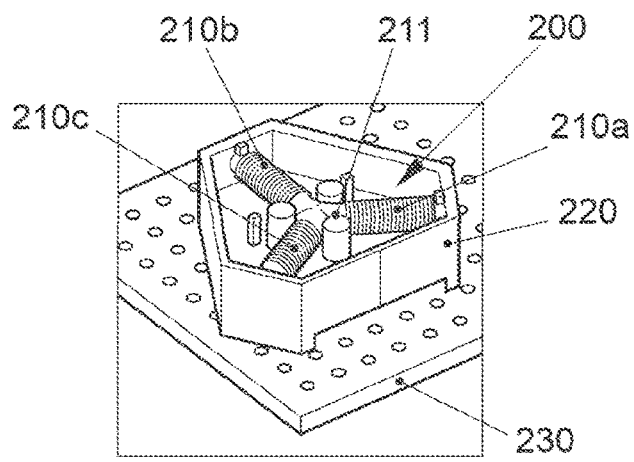
FIG. 9D is a perspective view of the coil arrangement of FIG. 9A, wherein the coil arrangement is mounted on a circuit board.
Figure 9E:
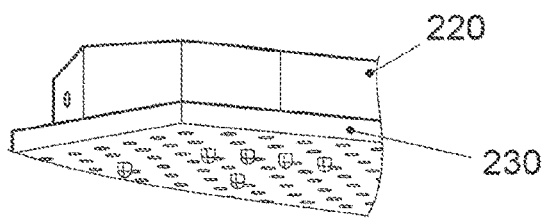
FIG. 9E is a further perspective view of the coil arrangement of FIG. 9A, wherein the coil arrangement is mounted on a circuit board.
Figure 9F:
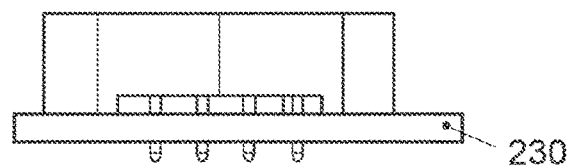
FIG. 9F is a side view of the coil arrangement of FIGS. 9D and 9E.
Figure 10A:
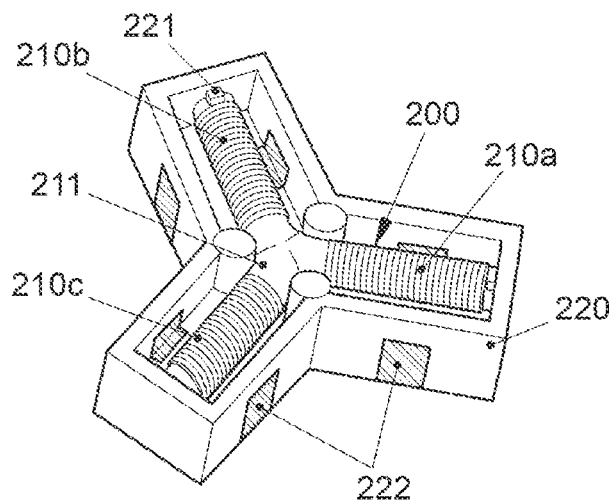
FIG. 10A is a perspective view of the coil arrangement of FIG. 1 in an alternative embodiment of the housing.
Figure 10B:
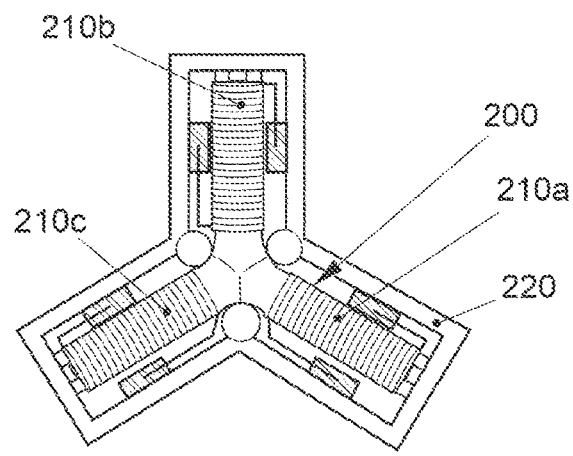
FIG. 10B is a plan view from above of the coil arrangement with the alternative embodiment of the housing of FIG. 10A.
Figure 10C:
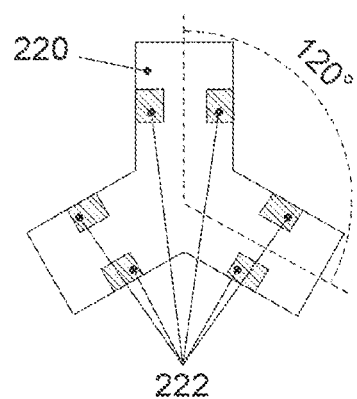
FIG. 10C is a plan view from below of the coil arrangement with the alternative embodiment of the housing of FIG. 10A.
Figure 10D:
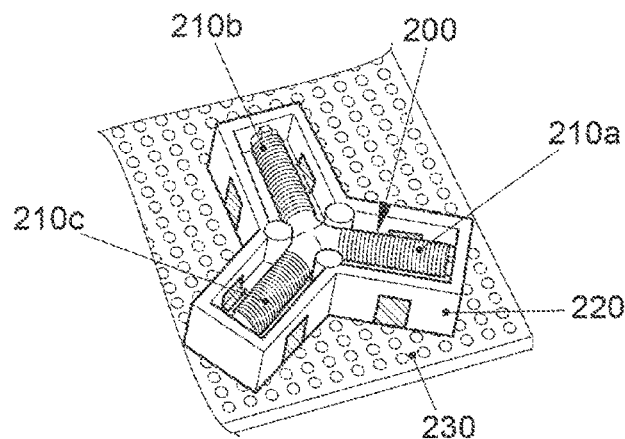
FIG. 10D is a perspective view of the coil arrangement of FIG. 1 with the alternative embodiment of the housing, wherein the coil arrangement is mounted on a circuit board.
Figure 10E:
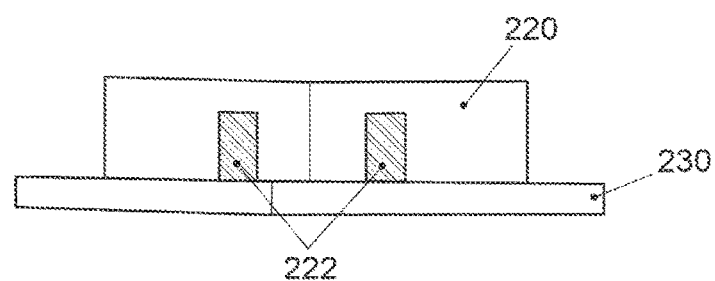
FIG. 10E is a side view of the coil arrangement of FIG. 1 with the alternative embodiment of the housing, wherein the coil arrangement is mounted on a circuit board.

FIG. 8C is a schematic diagram showing an AC voltage source 242 connected to a supply line 241. The supply line 241 can be, for example, a 12 V DC power supply of a vehicle. The AC voltage source 242 is configured for generating an alternating voltage as shown in FIG. 3. FIG. 8C additionally shows a computer unit 243, which is configured for receiving control signals over a 240 and based thereon, for controlling the emission of the rotating field 80 or the non-rotating electromagnetic fields.

In FIGS. 9A-9F and 10A-10D, different views of the coil arrangement 200 of FIG. 1 are shown in a housing 220. The capacitors 225, 226 and additional power electronics can also be arranged within the housing. Electrical contacts 222 are shown, which can connect the coil arrangement to conductor tracks on a printed circuit board 230. For example, the contacts can be connected to the AC voltage source 242 via conductor track on the printed circuit board. In addition, holders 221 are provided, which fix the coil arrangement 200 in a stationary position inside the housing 220. The housing can act as protection against shaking, debris deposits, moisture, etc., and can optionally be produced from plastic. A top side of the housing 220 is not shown for the sake of clarity, but can be provided. As is clear from FIGS. 9A-9F, and 10A-10D, a top and bottom of the housing, as well as the printed circuit board 230 can be parallel to the plane of rotation 300 or the coil plane. The special shape of the housing is not limiting and can be chosen differently. It should be understood that, depending on the installation space available, different housings 220 may be optional. The housing can be mounted oriented parallel to the ground.

Figure 11:
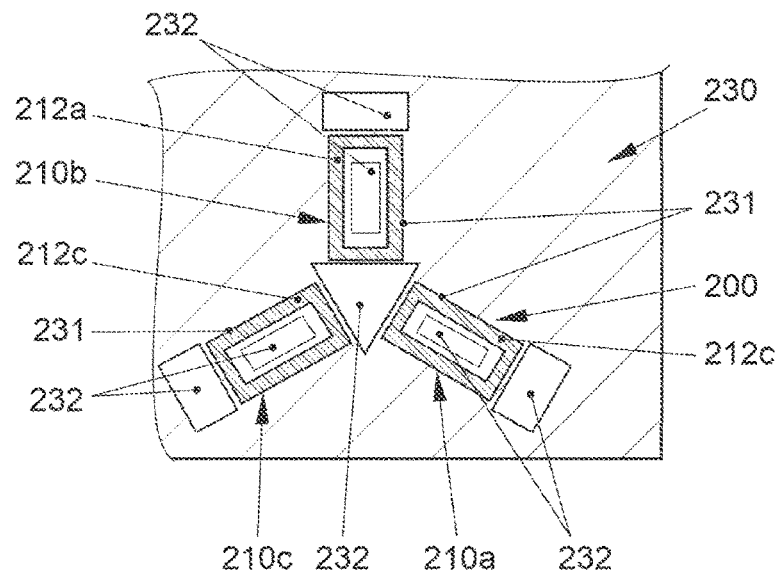
FIG. 11 is a plan view of an embodiment of the coil arrangement integrated on a printed circuit board, in which the coils are formed by conductor tracks.

FIG. 11 shows an alternative implementation of the coil arrangement 200. This implementation corresponds to an integrated design, in which conductor tracks 231 form the coil windings 212a, 212c, 212e in a planar state on a printed circuit board 230 (dashed). The conductor tracks can be produced, for example, by etching or masking or lithography techniques.

Recesses 232 are provided in the printed circuit board 230, in which the coil yoke 211 (not shown in FIG. 11) can be introduced and fixed. This implementation can result in low space requirements.

In the following, based on FIGS. 12-14 a system architecture of a positioning system 100, which comprises a single coil arrangement 200, will be explained. In other scenarios, the positioning system 100 also comprises more than one coil arrangement 200. By techniques, such as have been described above in relation to FIGS. 7A and 7B, the positioning system 100 can exactly determine a distance r of a receiver 30. The receiver 30 can comprise, for example, a magnetic field sensor. The Receiver 30 can implement, for example, an identification sensor for a vehicle. The position determination can be performed relatively accurately both in the outdoor area as well as in the interior of the vehicle, for example, accurate to within a few centimeters. For example, the determined position of the receiver 30 can be displayed graphically to the user on a screen, for example, on a display screen of an on-board computer of the vehicle.

Figure 12:
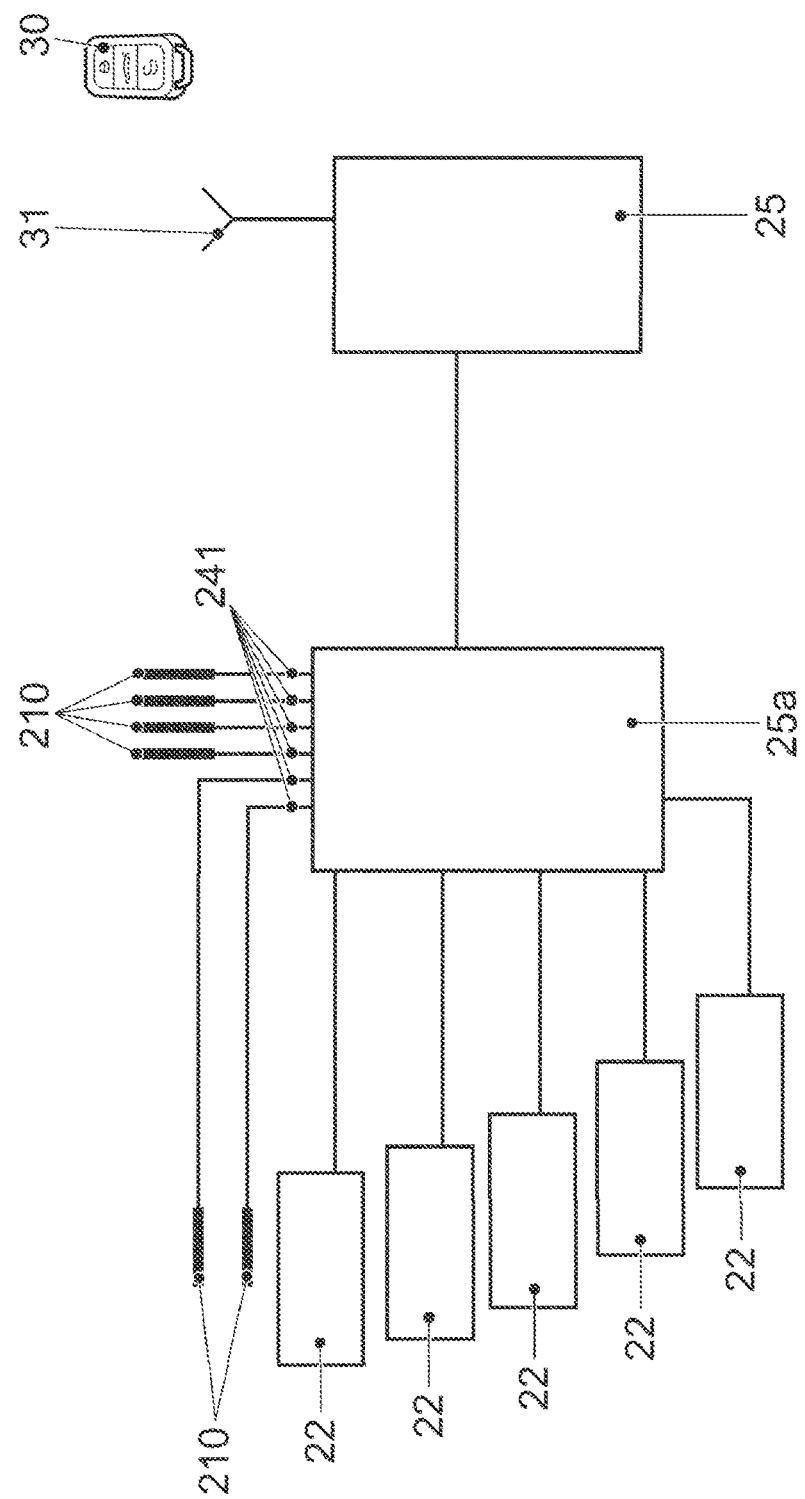
FIG. 12 is a schematic diagram of a prior-art positioning system for an identification sensor of a vehicle.

In FIG. 12, a prior-art positioning system 100 is first shown. A control apparatus 25 is connected to another control apparatus 25a. For example, the control apparatus 25 can be part of a central computer unit of the vehicle. In addition, the control apparatus 25 is connected to a wireless interface 31, which can establish data transmission with the identification sensor 30. The other control apparatus 25a is connected via data lines to door handle sensors 22 of the vehicle. These door handle sensors 22 can detect actuation or an access request of the closable doors of the vehicle, such as passenger doors and tailgates. In addition, the other controller 25a is connected via supply lines 241 to individual coils 210 for generating electromagnetic fields, which can be measured by the identification sensor 30. As can be seen from FIG. 12, the system architecture of the prior-art positioning system is relatively complex. The two-wire supply lines 241 may be provided in large numbers, which makes a complicated wiring of the vehicle necessary: the control apparatus 25a comprises an AC voltage source, which supplies the coils 210 with voltage via the line 241a.

Figure 13:
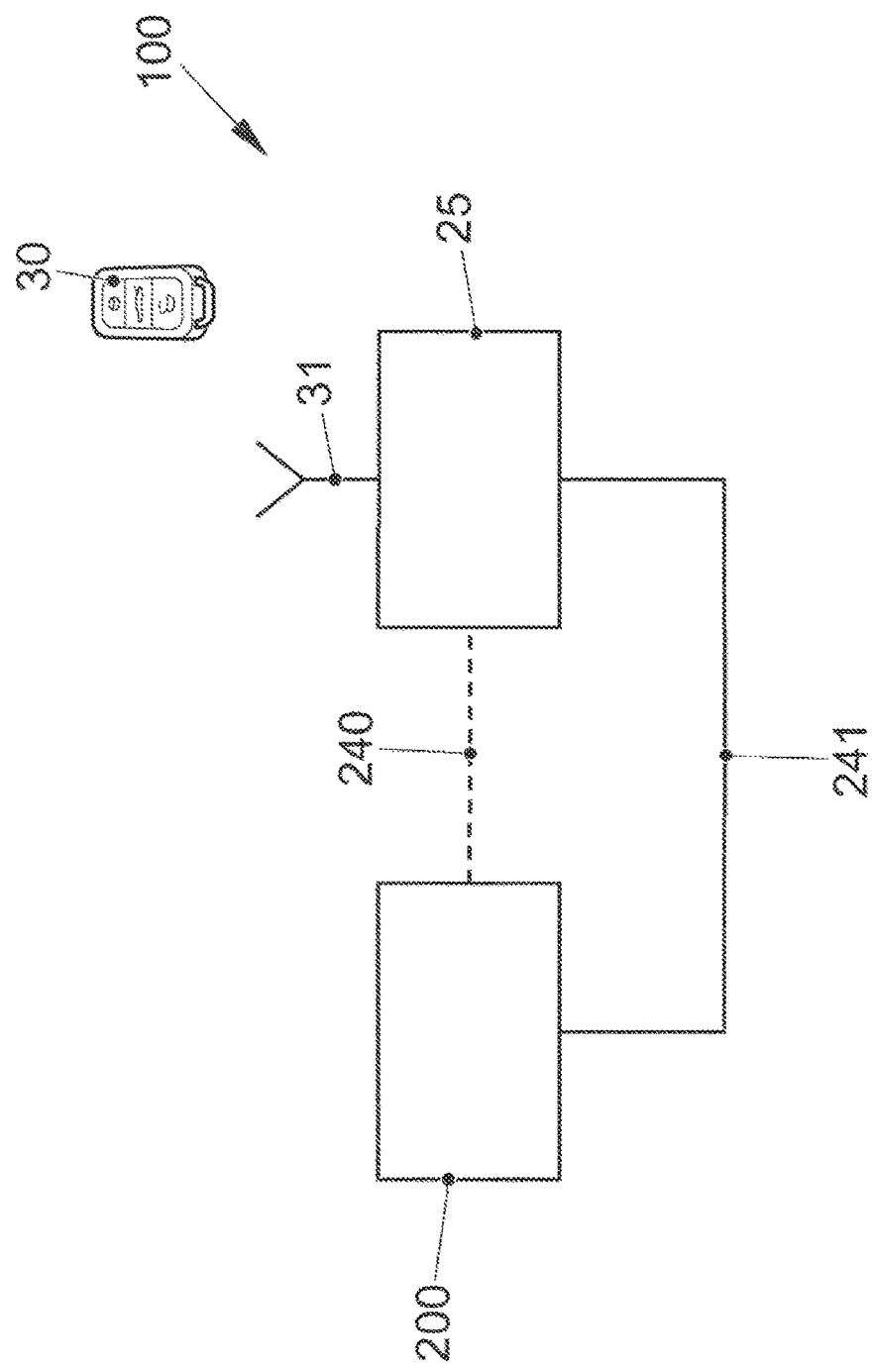
FIG. 13 is a schematic diagram of a positioning system for an identification sensor of a vehicle which implements a receiver, according to different embodiments, wherein the positioning system comprises a single coil arrangement as a transmitter.

FIG. 13 shows a schematic diagram of the positioning system 100. The positioning system 100 as described in FIG. 13 comprises a control apparatus 25 which is linked to the coil arrangement 200. For example, the coil arrangement 200 can be connected via a processing unit (not shown in FIG. 13) and via a bus system 240 to the control apparatus 25. The bus system 240 can facilitate a data communication between the coil arrangement 200 and the control apparatus 25. The bus system can be, for example, a "Controller Area Network (CAN)" bus system, a "Local Interconnect Network" (LIN), or "FlexRay" or another bus system. The control apparatus 25 can send commands via the bus system 240, which are received and interpreted by the processing unit of the coil arrangement 200. The coil arrangement 200 is configured to generate the rotating electromagnetic field 80 in response to the control signal. The energy required for this can be obtained from a supply line 241. For example, the supply line can provide a DC voltage (for example, 12 V), so that a suitable electrical circuit (not shown in FIG. 13), i.e., an AC voltage source, is configured in the coil arrangement 200, to generate the AC voltages required for generating the rotating electromagnetic field 80 with a predefined phase relationship.

Figure 14:
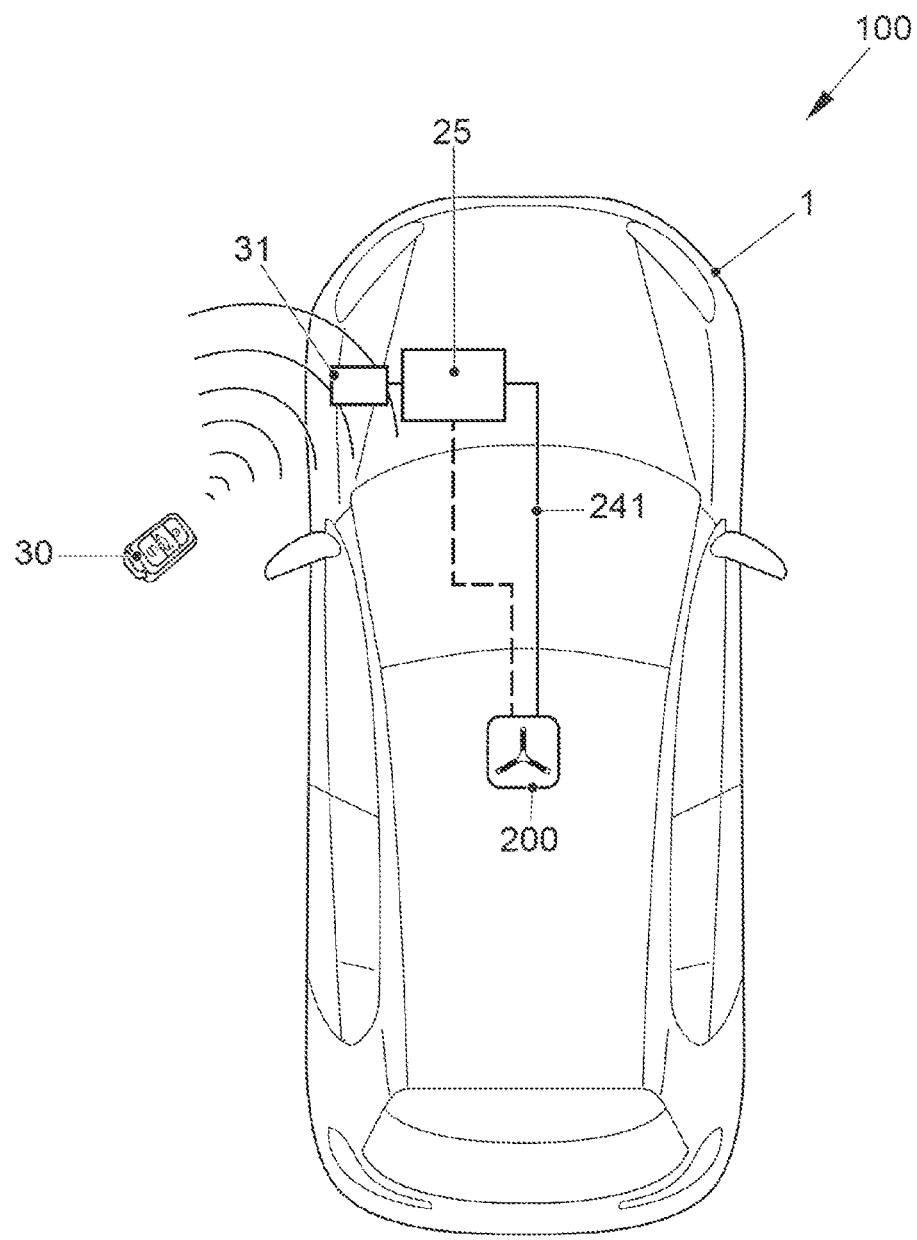
FIG. 14 shows a structural arrangement of different components of the positioning system of FIG. 13 in the vehicle.

FIG. 14 shows the positioning system 100 with an arrangement in a vehicle 1. From FIG. 14, in turn, it can be seen that a control function and a power supply are provided via separate lines 240, 241. In FIG. 14 the coil arrangement 200 is installed centrally in the vehicle 1. It is also possible that the coil arrangement 200 is arranged at a different position within the vehicle 1, for example, on the left side or the right side in the B-pillars and/or in the C-pillars. The coil arrangement 200 could also be installed, for example, in the area of the trunk of the vehicle 1.

Figure 15:
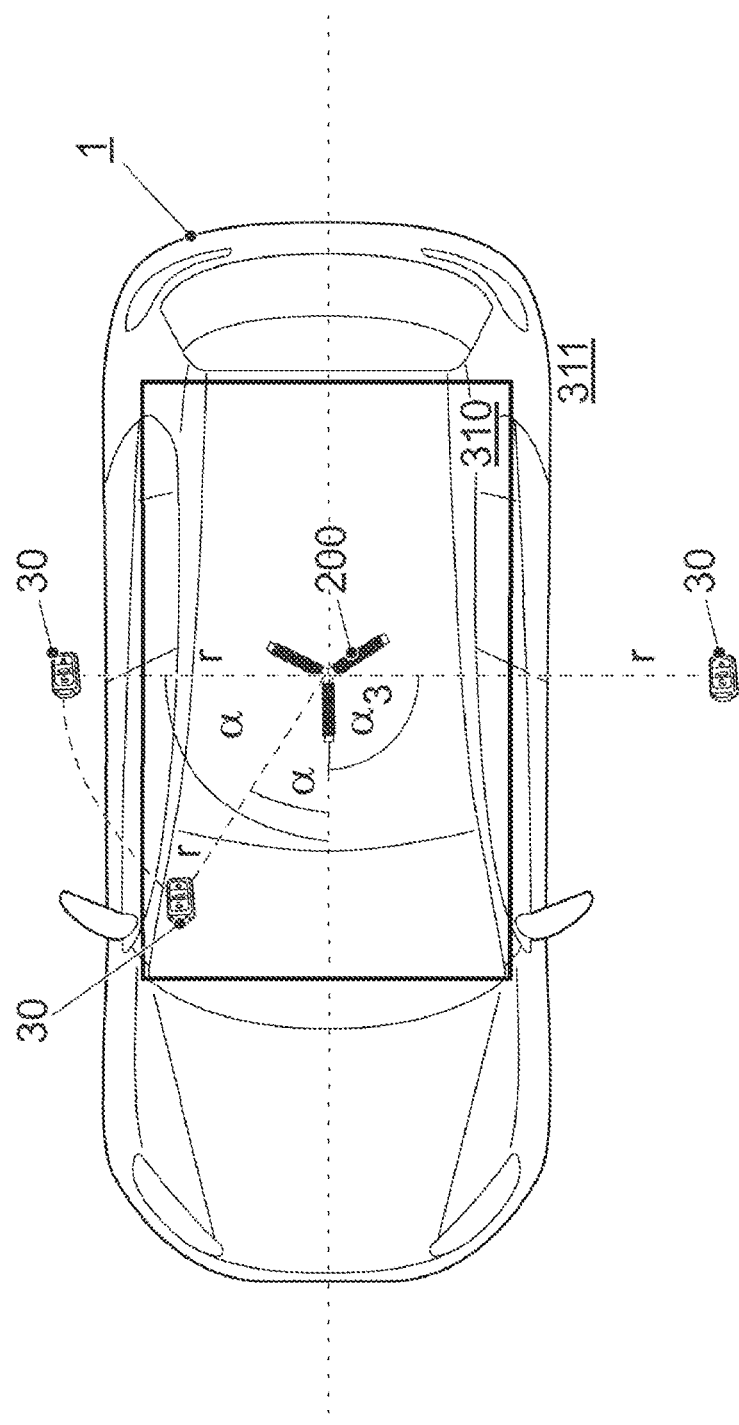
FIG. 15 the determination of the distance and the angular arrangement of the receiver with respect to the coil arrangement.

Referring to FIG. 15, it can be seen that for different distances r it is possible to distinguish between various positions of the identification sensor 30. It can be desirable to determine whether the identification sensor 30 is located inside or outside of the specified surrounding region 310 of the coil arrangement 200. From FIG. 15 it is evident that in this context, it can be desirable, in addition to the distance r to also determine the angular arrangement α between the identification sensor 30 and the coil arrangement 200. This can be the case, since otherwise, depending on the position of the coil arrangement 200 in the vehicle 1 and the position of the identification sensor 30 in relation to the coil arrangement 200 it cannot be uniquely differentiated whether the identification sensor 30 is located in the surrounding region 310 or in the far range 311.

To determine the angular arrangement α of the receiver 30 with respect to the coil arrangement 200 it can be possible that the coil arrangement 200 is activated such that the coil arrangement 200 emits the rotating electromagnetic field 80 and the at least two non-rotating electromagnetic fields sequentially. A corresponding method is illustrated by a flowchart in FIG. 16.

Firstly, in step S1 the coil arrangement 200 is activated in such a way that the coil arrangement 200 emits the rotating electromagnetic field 80. In so doing, the coil arrangement 200 can be activated in such a way that the different coils 210a, 210b, 210c are energized in a phase-shifted manner. Then in step S2, the magnetic field measurement data for the rotating electromagnetic field 80 are obtained. These magnetic field measurement data indicate the amplitude 81 of the rotating electromagnetic field 80 at the position of the receiver 30, for example, directly or indirectly. For example, the magnetic field measurement data could already indicate the time-averaged value 190.

In the context of steps S1 and S2, it can be possible to vary the transmission power 111 and/or the frequency of the rotating electromagnetic field 80 as a function of time. In this way it may be possible in an energy-efficient manner, to obtain the magnetic field measurement data then to determine the distance r between the receiver 30 and the coil arrangement 200.

In step S3, the coil arrangement 200 is activated in such a way that the coil arrangement 200 emits a first non-rotating electromagnetic field. This can be effected by activating a single coil 210a, 210b, 210c of the coil arrangement 200. This can also be effected by activating two or more coils 210a, 210b, 210c of the coil arrangement 200, wherein two or more coils 210a, 210b, 210c are energized in phase. Then in step S4, the magnetic field measurement data for the current non-rotating electromagnetic field are obtained. These magnetic field measurement data indicate the amplitude of the respective current non-rotating electromagnetic field at the position of the receiver 30, for example, directly or indirectly.

In step S5, it is checked whether magnetic field measurement data for another non-rotating electromagnetic field are required. For example, in general an accuracy when determining the angular arrangement between the receiver 30 and the coil arrangement 200 is greater, the more magnetic field measurement data are obtained for different non-rotating electromagnetic fields.

In step S6, the distance r and angular arrangement α are determined based on the magnetic field measurement data for the rotating electromagnetic field 80, and based on the magnetic field measurement data for the two or more non-rotating electromagnetic fields.

Figure 16:
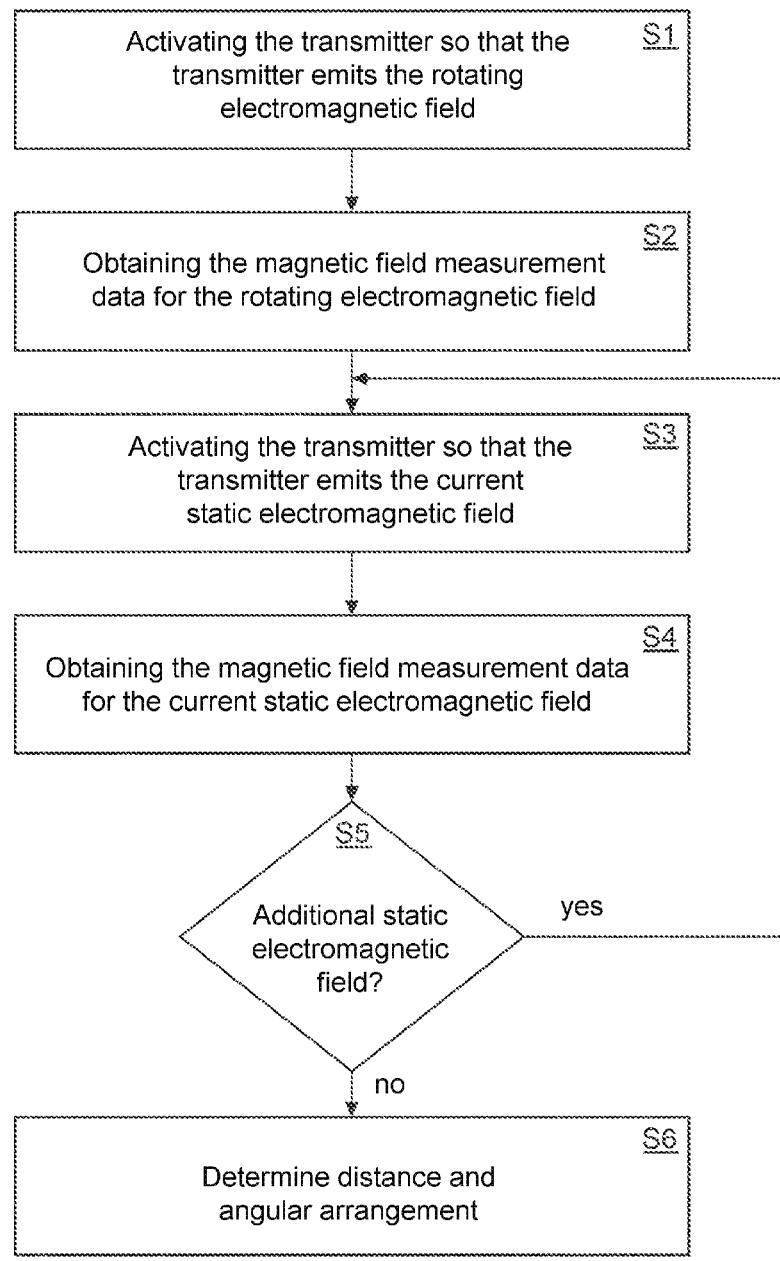
FIG. 16 is a flow chart of a method in accordance with different embodiments.

While in FIG. 16 a specific sequence of the various steps is illustrated, in other scenarios, other sequences of steps can also be implemented. For example, it would be possible for steps S3-S5 to be carried out first, and then the steps S1 and S2. In other scenarios, it would be possible that the steps S1 and S2 are executed first and then the distance r between the coil arrangement 200 and the receiver 30 are determined. It would then be possible, for example, for the coil arrangement 200 in step S3 to be activated in such a way that a transmission power 111 is used for emitting the current non-rotating electromagnetic field. This transmission power 111 can be chosen, for example, the greater (smaller), the greater the distance r between the coil arrangement 200 and the receiver 30.

In the following, different embodiment are described in relation to determining the angular arrangement α of the receiver 30 with respect to the coil arrangement 200 based on the magnetic field measurement data for the at least two non-rotating electromagnetic fields.

Figure 17:
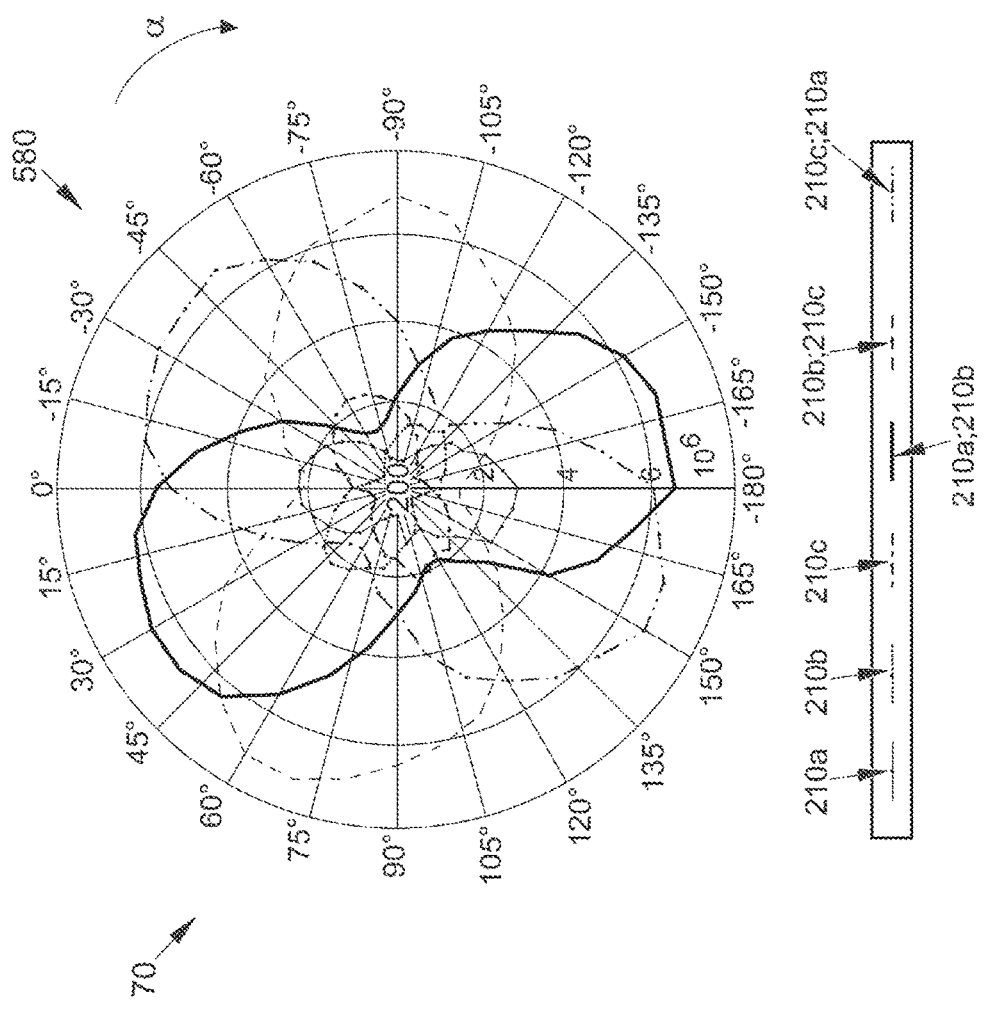
FIG. 17 is a polar plot of non-rotating electromagnetic fields with two degrees of anisotropy.

In FIG. 17 the anisotropy 580 is plotted for different non-rotating electromagnetic fields 70. The different non-rotating electromagnetic fields 70 are obtained by energizing the different coils 210a, 210b, 210c of the coil arrangement 200 of FIG. 1. The anisotropies 580 of the non-rotating electromagnetic fields 70 are of two degrees with a 180° periodicity in the coil plane. From FIG. 17 it can be seen that the maxima of the anisotropies 580 of the non-rotating electromagnetic fields 70, which are obtained by energizing two of the coils in each case 210a, 210b, 210c in phase, are rotated by 30° in the coil plane with respect to the maxima of the anisotropies 580 of the non-rotating electromagnetic fields 70, which are obtained by energizing only one of the coils 210a, 210b, 210c. It can also be seen that the amplitudes of the maxima of the anisotropies 580 of the non-rotating electromagnetic fields 70, which are obtained by energizing 2 of the coils in each case 210a, 210b, 210c in phase, are approximately 3 times greater than the amplitudes of the maxima of the anisotropies 580 of the non-rotating electromagnetic fields 70, which are obtained by energizing only one of the two coils 210a, 210b, 210c.

Figure 18A:
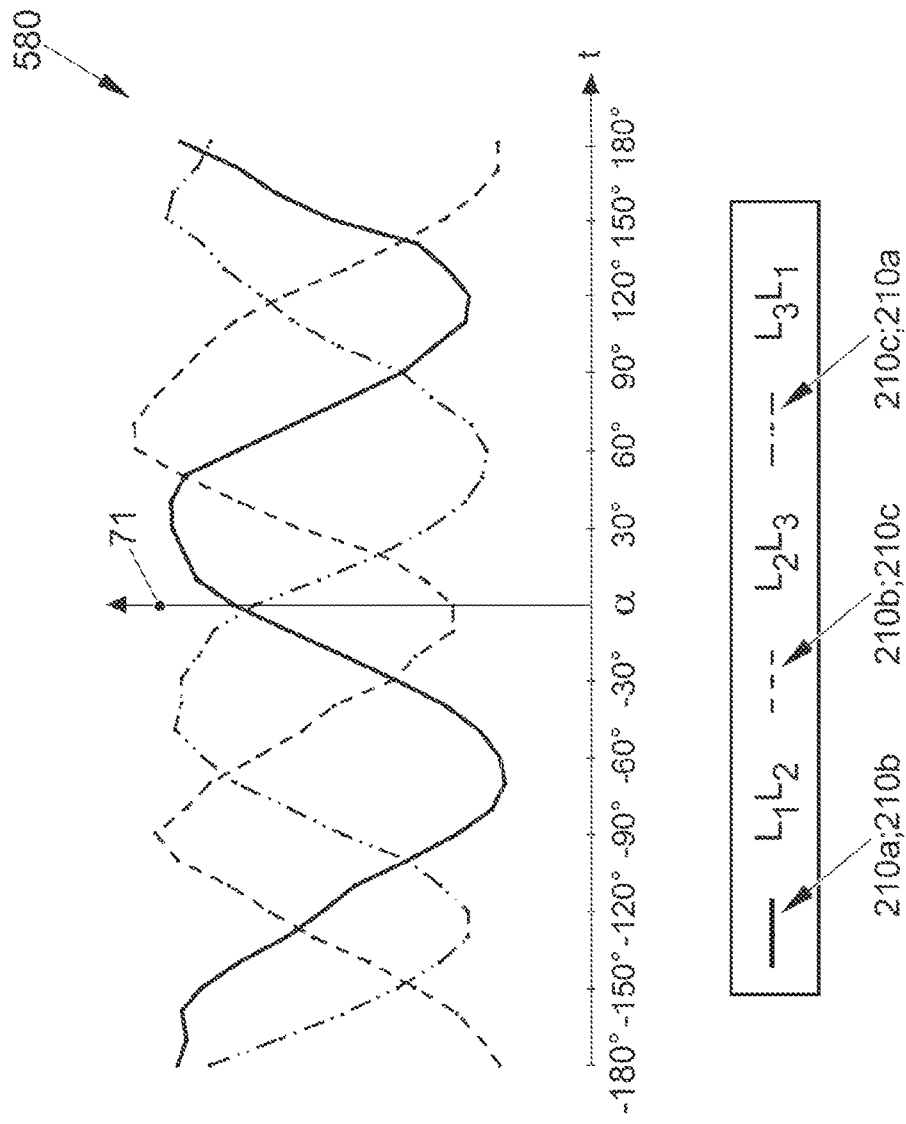
FIG. 18A is a 360° line plot of the anisotropy of FIG. 17.

FIG. 18A shows the anisotropies 580 of non-rotating electromagnetic fields 70, obtained by energizing in each case two of the coils 210a, 210b, 210c in phase, as a function of the angular arrangement α in the range from −180° to 180°. From FIG. 18, the 180° periodicity of the anisotropies 580 can be identified.

Figure 18B:
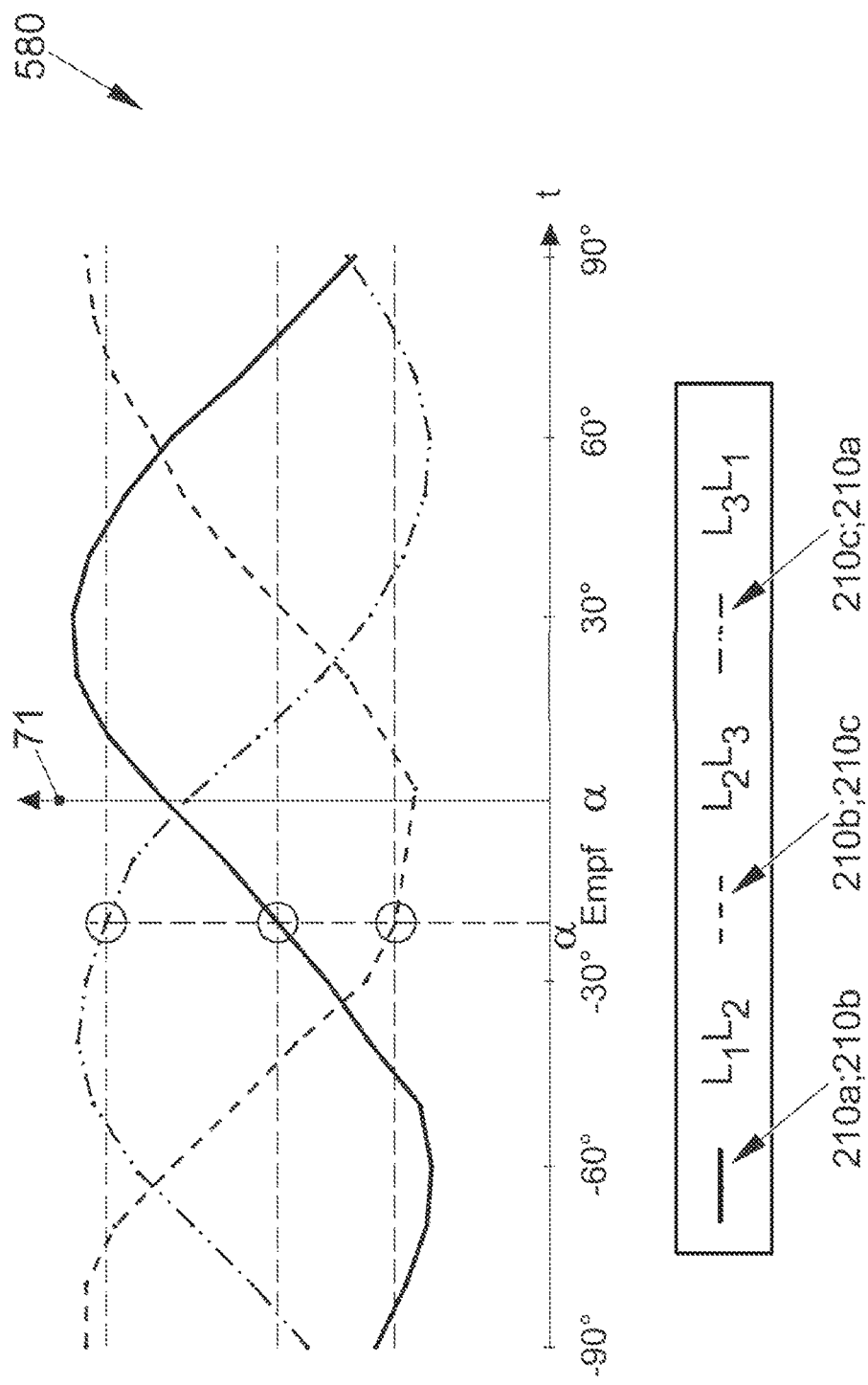
FIG. 18B is a 180° line plot of the anisotropy of FIG. 17, illustrating the determination of the angular arrangement of the receiver with respect to the transmitter.

FIG. 18B shows the anisotropies 580 of the non-rotating electromagnetic fields 70, obtained by energizing in each case two of the coils 210a, 210b, 210c in phase, as a function of the angular arrangement α in the range from −90° to 90°. By the use of three non-rotating electromagnetic fields 70 it is possible to uniquely infer the angular arrangement α in the range −90° to 90°. A unique determination of the angular arrangement α in the range −90° to 90° would already be possible for two non-rotating electromagnetic fields 70.

Figure 19:
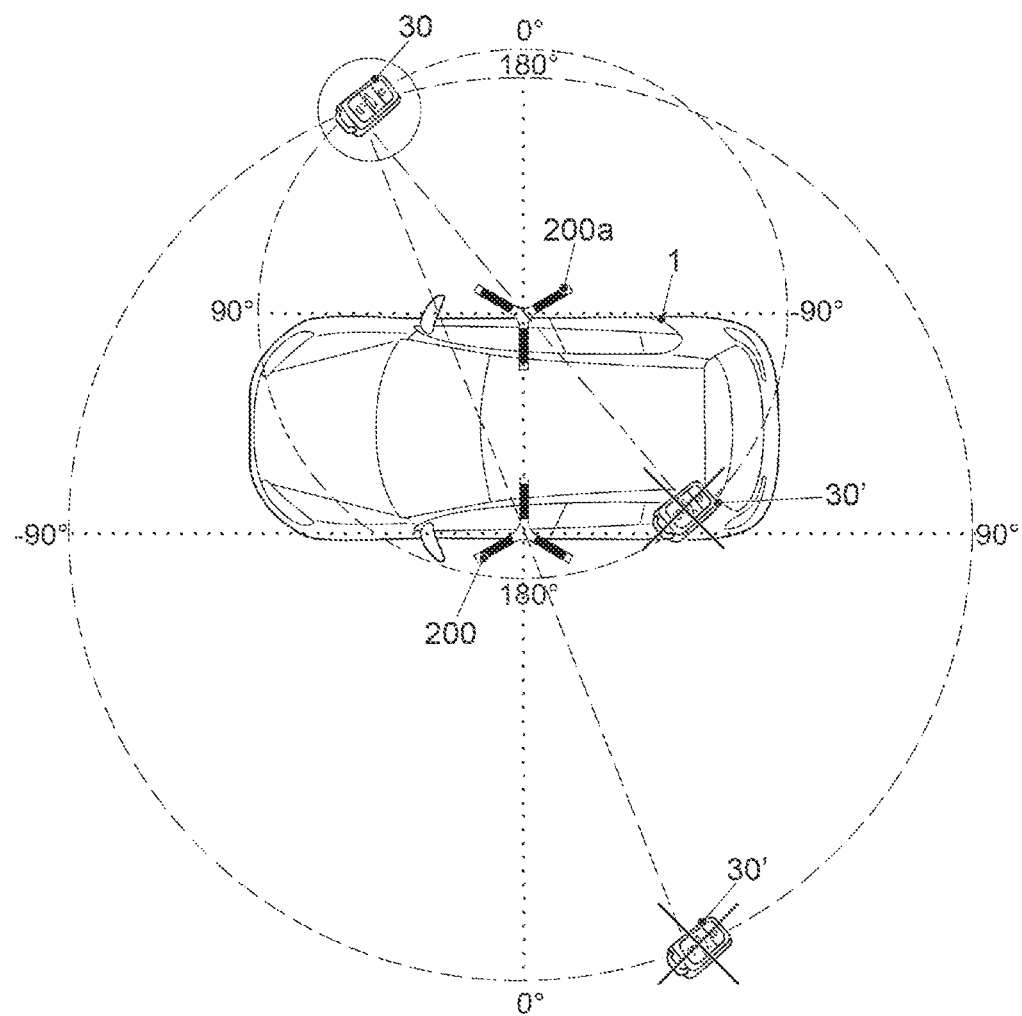
FIG. 19 shows a 180° ambiguity in determining the angular arrangement of the receiver with respect to the transmitter in the scenario of FIGS. 18A and 18B for a positioning system, which comprises two coil arrangements.

Due to the 180° periodicity of the anisotropies 580 (compare FIGS. 18A, 18B) however, a 180° ambiguity exists (compare FIG. 19). Different techniques are conceivable for resolving the 180° ambiguity. For example, as shown in the scenario of FIG. 19, an additional coil arrangement 200a can be used to be able to infer the actual position of the receiver 30 unambiguously. With the additional coil arrangement 200a, appropriate techniques can be used, such as those illustrated above in connection with the determination of the angular arrangement between the receiver 30 and the coil arrangement 200. Using comparative results which are obtained for the angular arrangement of the receiver 30 with respect to the coil arrangement 200, 200a, incorrect positions 30' of the receiver 30, which arise due to the 180° ambiguity, can be eliminated.

In general, the additional coil arrangement 200a can also be designed more simply than the coil arrangement 200. For example, the additional coil arrangement 200a might only comprise a single coil. The 180° ambiguity can then be resolved by a simple distance measurement based on a non-rotating electromagnetic field with an anisotropy in the coil plane, which is emitted by the additional coil arrangement.

Figure 20:
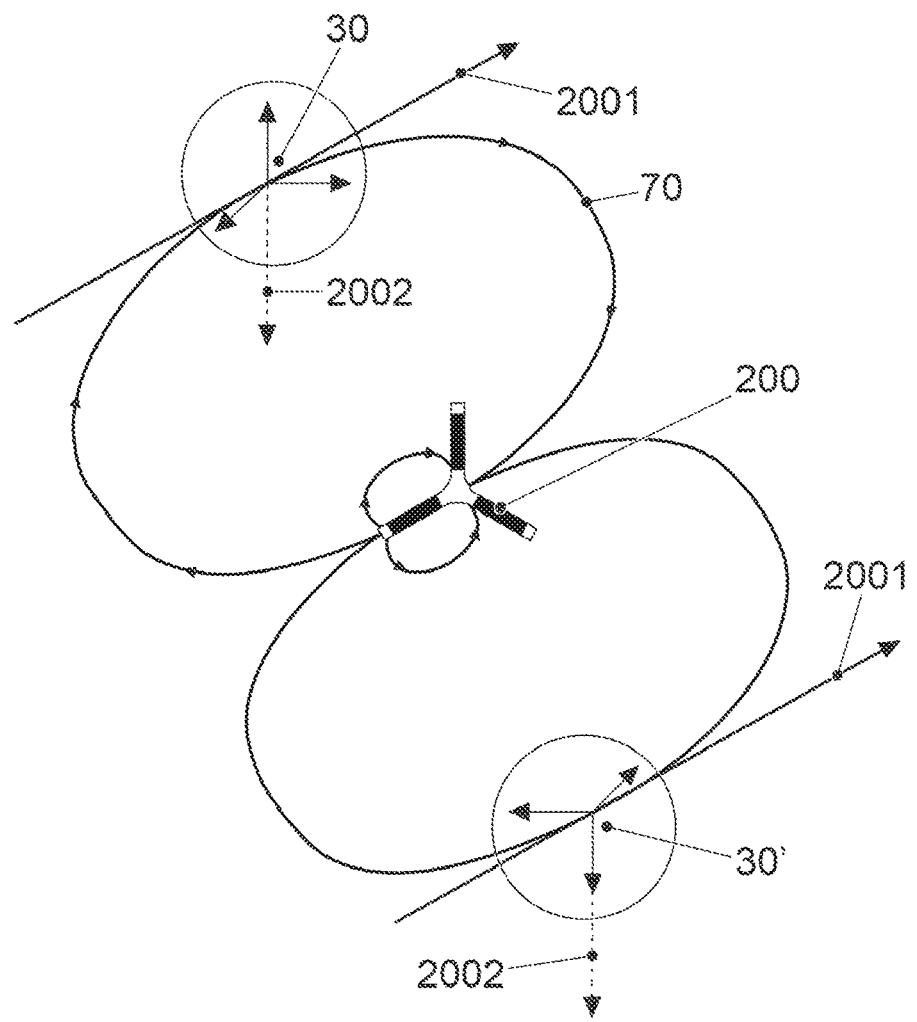
FIG. 20 shows a direction of a magnetic field line of a non-rotating electromagnetic field at the position of the receiver and the resolution of the 180° ambiguity based on the direction of the magnetic field line.

Another technique to eliminate the effects of the 180° ambiguity is illustrated by reference to FIG. 20. This technique works with only a single coil arrangement 200. This technique is based on the fact that the direction of a magnetic field line 2001 of the at least two non-rotating electromagnetic fields 70 can be determined at the position of the receiver 30. The determination of the angular arrangement α of the receiver 30 with respect to the coil arrangement 200 can then additionally be based on the directions of the magnetic field lines 2001 of the at least two non-rotating electromagnetic fields 70. These techniques are further based on the fact that acceleration measurement data are obtained, which indicate an orientation of the receiver 30 with respect to a direction of the force of gravity 2002. The determination of the angular arrangement of the receiver 30 with respect to the coil arrangement 200 can then be additionally based on the orientation of the receiver 30 with respect to the direction of the force of gravity 2002.

For example, for the magnetic field line 2001 or the tangent of the magnetic field component of the non-rotating electromagnetic field 70, a reference to the earth can be formed by the direction of gravity 2002 or the direction of the gravitational acceleration. For example, the magnetic field line 2001 can define a right-handed coordinate system, for example, in connection with a direction which is oriented towards the coil arrangement 200. Then, a Z-component of the right-handed coordinate system can be compared with the direction of gravity 2002 (see FIG. 20), which allows the 180° ambiguity to be resolved.

Figure 21:
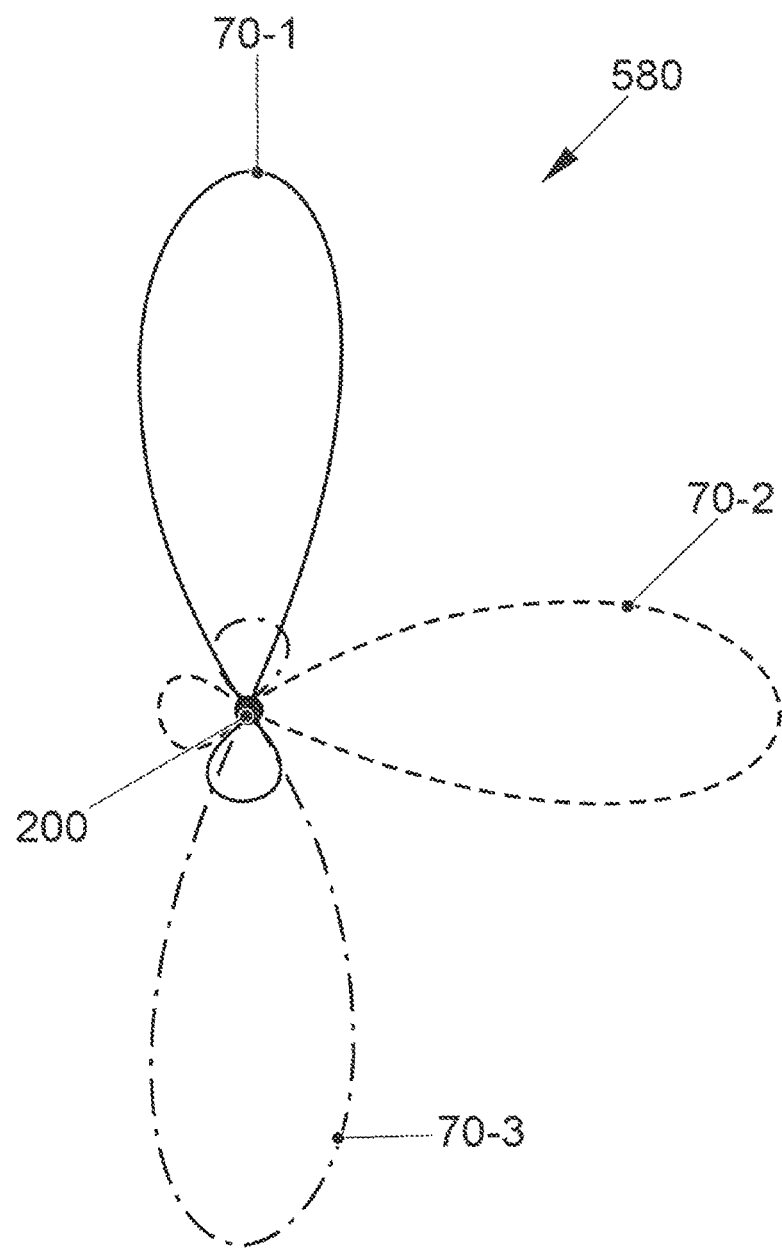
FIG. 21 shows a polar plot of non-rotating electromagnetic fields with a one-degree anisotropy.

Another technique for resolving the 180° ambiguity is illustrated by reference to FIG. 21. In this case three non-rotating electromagnetic fields 70-1, 70-2, 70-3 are used. The three non-rotating electromagnetic fields 70-1, 70-2, 70-3 have a single-degree anisotropy 580 in the coil plane. Therefore, there is no 180° periodicity of the single-celled anisotropy 580, so that no 180° ambiguity occurs. To generate the single-degree anisotropies 580, so that the non-rotating electromagnetic fields 70 have significant amplitudes 71 in only one direction in relation to the coil arrangement 200, a different arrangement of coils of the coil arrangement 200 can be used, for example, as discussed above in relation to the figures. For example, a U-shaped arrangement of adjacent pairs of coils in the coil plane can be used. For example, pairs of the plurality of coils adjacent in the coil plane could each have an angular arrangement with an angle of 60° to each other. In this way, a directed magnetic field component of the non-rotating electromagnetic fields can be obtained.

It goes without saying that the features of the disclosed embodiments described above can be combined with each other. The features can be used not only in the described combinations, but also in other combinations or in isolation, without departing from the scope of the disclosure.

LIST OF REFERENCE NUMERALS

1 Vehicle
100 Positioning system
111 Transmission power
190 Time-averaged value
200, 200a Transmitter/coil arrangement
2001 Magnetic field line
2002 Gravity
210, 210a, 210b, 210c Coil
211 Coil yoke
211a, 211b, 211c Arm of coil
212a-212f Coil winding
213a, 213b, 213c Angle
22 Door handle sensor
220 Housing
221 Holder
222 Contacts
225, 226 Capacitor
230 Printed circuit board
231 Conductor track
232 Recess
240 Bus system
241 Supply power
242 AC voltage source
243 Processor unit
25, 25a Control apparatus
30 Receiver/identification sensor
30' Receiver
31 Wireless interface
310 Surrounding region
311 Far range
580 Anisotropy
70, 70-1, 70-2, 70-3 Electromagnetic fields
71 Amplitude
80 Electromagnetic field
81 Amplitude
82 Phase
85 Current flow
P Point R Distance
S1-S6 Step
T1-T4 Point in time
x1-x4 Contact
α Angular arrangement

The invention claimed is:

1. A method comprising:
activating a transmitter surrounded by a specified surrounding region to emit at least two electromagnetic fields, wherein an amplitude of each of the at least two electromagnetic fields has an anisotropy in one plane, wherein the anisotropy is statically aligned in the plane;
obtaining magnetic field measurement data, which indicate the amplitudes of the at least two electromagnetic fields at the position of a receiver; and
determining an angular arrangement of the receiver with respect to the transmitter based on the amplitudes of the at least two electromagnetic fields at the position of the receiver; and
determining whether the receiver is located inside of the specified surrounding region of the transmitter based at least on the determined angular arrangement of the receiver with respect to the transmitter.

2. The method of claim 1, further comprising:
activating the transmitter to emit an additional electromagnetic field, wherein the amplitude of the additional electromagnetic field has an anisotropy in the plane, wherein the anisotropy rotates in the plane as a function of time;
obtaining additional magnetic field measurement data, which indicate the amplitude of the additional electromagnetic field at the position of the receiver;
determining a time-averaged value of the amplitude of the additional electromagnetic field at the position of the receiver based on the additional magnetic field measurement data; and
determining a distance between the receiver and the transmitter based on the time-averaged value of the amplitude of the additional electromagnetic field at the position of the receiver,
wherein the determination of whether the receiver is located inside of the specified surrounding region is also based on the distance between the receiver and the transmitter in addition to the determined angular arrangement of the receiver with respect to the transmitter.

3. The method of claim 2, wherein the activation of the transmitter to emit an additional electromagnetic field includes phase-shifted energizing of at least three coils of the transmitter arranged in the plane.

4. The method of claim 2, wherein the transmitter is activated to emit the additional electromagnetic field with a time dependence of the transmission power and/or of the frequency and wherein a time constant of the time dependence of the transmission power and/or the frequency is greater than a time constant of the time-averaged value of the amplitude of the additional electromagnetic field.

5. The method of claim 2, further comprising determining a transmission power for the at least two electromagnetic fields based on the distance determined between the receiver and the transmitter, wherein the transmitter is activated to emit the at least two electromagnetic fields with the determined transmission power.

6. The method of claim 1, wherein the activation of the transmitter to emit at least two electromagnetic fields comprises energizing a single coil of a plurality coils of the transmitter or energizing, in phase, at least two of the coils of the transmitter that are arranged in the plane for each of the at least two electromagnetic fields.

7. The method of claim 1, wherein at least one of the at least two electromagnetic fields has two degrees of anisotropy with a 180° periodicity in the plane.

8. The method of claim 1, wherein at least one of the at least two electromagnetic fields has one degree of anisotropy in the plane.

9. The method of claim 8, wherein the transmitter comprises six or more in plane coils and that adjacent pairs of six or more coils of the transmitter in the plane each enclose an angle with each other in the range of 30°-90°.

10. The method of claim 1, wherein the magnetic field measurement data each indicate a direction of a magnetic field line of the at least two electromagnetic fields at the position of the receiver, and wherein the determination of the angular arrangement of the receiver with respect to the transmitter is additionally based on the directions of the magnetic field lines of the at least two electromagnetic fields.

11. The method of claim 10, further comprising obtaining acceleration measurement data, which indicate an orientation of the receiver with respect to a direction of the force of gravity, wherein the determination of the angular arrangement of the receiver with respect to the transmitter is additionally based on the orientation of the receiver with respect to the direction of the force of gravity.

12. A control apparatus of a transportation vehicle, wherein the control apparatus is configured to carry out a method that activates a transmitter surrounded by a specific surrounding region to emit at least two electromagnetic fields, wherein an amplitude of each of the at least two electromagnetic fields has an anisotropy in one plane, wherein the anisotropy is statically aligned in the plane,
wherein the method obtains magnetic field measurement data, which indicate the amplitudes of the at least two electromagnetic fields at the position of a receiver,
wherein the method determines an angular arrangement of the receiver with respect to the transmitter based on the amplitudes of the at least two electromagnetic fields at the position of the receiver, and
wherein the method determines whether the receiver is located inside of the specified surrounding region of the transmitter based at least on the determined angular arrangement of the receiver with respect to the transmitter.

13. The control apparatus of claim 12, further configured to generate as a function of the angular arrangement of the receiver with respect to the transmitter a control signal that controls a locking condition of at least one vehicle door of the transportation vehicle.

14. A transportation vehicle comprising:
a first transmitter;
a second transmitter; and
a control apparatus configured to carry out a method that activates the first transmitter to emit at least two electromagnetic fields, wherein an amplitude of each of the at least two electromagnetic fields has an anisotropy in one plane, wherein the anisotropy is statically aligned in the plane, wherein the method obtains magnetic field measurement data, which indicate the amplitudes of the at least two electromagnetic fields at the position of a receiver, wherein the method determines an angular arrangement of the receiver with respect to the first transmitter based on the amplitudes of the at least two electromagnetic fields at the position of the receiver, and wherein the method determines whether the receiver is located inside of the specified surrounding region of the transmitter based at least on the determined angular arrangement of the receiver with respect to the transmitter, wherein the first transmitter has at least three coils arranged in a plane, wherein the second transmitter has a single coil.

15. The control apparatus of claim 12, further configured to:

activate the transmitter to emit an additional electromagnetic field, wherein the amplitude of the additional electromagnetic field has an anisotropy in the plane, wherein the anisotropy rotates in the plane as a function of time;

obtain additional magnetic field measurement data, which indicate the amplitude of the additional electromagnetic field at the position of the receiver;

determine a time-averaged value of the amplitude of the additional electromagnetic field at the position of the receiver based on the additional magnetic field measurement data; and determine a distance between the receiver and the transmitter based on the time-averaged value of the amplitude of the additional electromagnetic field at the position of the receiver, wherein the determination of whether the receiver is located inside of the specified surrounding region is also based on the distance between the receiver and the transmitter in addition to the determined angular arrangement of the receiver with respect to the transmitter.

16. The control apparatus of claim 15, wherein the activation of the transmitter to emit an additional electromagnetic field includes phase-shifted energizing of at least three coils of the transmitter arranged in the plane.

17. The control apparatus of claim 15, wherein the transmitter is activated to emit the additional electromagnetic field with a time dependence of the transmission power and/or of the frequency, and wherein a time constant of the time dependence of the transmission power and/or the frequency is greater than a time constant of the time-averaged value of the amplitude of the additional electromagnetic field.

18. The control apparatus of claim 15, further configured to determine a transmission power for the at least two electromagnetic fields based on the distance determined between the receiver and the transmitter, wherein the transmitter is activated to emit the at least two electromagnetic fields with the determined transmission power.

19. The control apparatus of claim 12, wherein the activation of the transmitter to emit at least two electromagnetic fields comprises energizing a single coil of a plurality coils of the transmitter or energizing, in phase, at least two of the coils of the transmitter that are arranged in the plane, for each of the at least two electromagnetic fields.

20. The control apparatus of claim 12, wherein at least one of the at least two electromagnetic fields has two degrees of anisotropy with a 180° periodicity in the plane.

21. The control apparatus of claim 12, wherein at least one of the at least two electromagnetic fields has one degree of anisotropy in the plane.

22. The control apparatus of claim 21, wherein the transmitter comprises six or more in plane coils and that adjacent pairs of six or more coils of the transmitter in the plane each enclose an angle with each other in the range of 30°-90°.

23. The control apparatus of claim 12, wherein the magnetic field measurement data each indicate a direction of a magnetic field line of the at least two electromagnetic fields at the position of the receiver, and wherein the determination of the angular arrangement of the receiver with respect to the transmitter is additionally based on the directions of the magnetic field lines of the at least two electromagnetic fields.

24. The control apparatus of claim 23, further configured to obtains acceleration measurement data, which indicate an orientation of the receiver with respect to a direction of the force of gravity, wherein the determination of the angular arrangement of the receiver with respect to the transmitter is additionally based on the orientation of the receiver with respect to the direction of the force of gravity.

25. The transportation vehicle of claim 14, wherein the first transmitter has at least three coils, which are arranged in a plane and the second transmitter has a single coil.

26. The transportation vehicle of claim 14, wherein the first transmitter emits the at least two electromagnetic fields as well as an additional electromagnetic field.

27. The transportation vehicle of claim 26, wherein the control apparatus controls the first transmitter to emit an additional electromagnetic field, wherein the amplitude of the additional electromagnetic field has an anisotropy in the plane, wherein the anisotropy rotates in the plane as a function of time, and wherein the control apparatus obtains additional magnetic field measurement data, which indicate the amplitude of the additional electromagnetic field at the position of the receiver, determines a time-averaged value of the amplitude of the additional electromagnetic field at the position of the receiver based on the additional magnetic field measurement data; and determines a distance between the receiver and the first transmitter based on the time-averaged value of the amplitude of the additional electromagnetic field at the position of the receiver, wherein the determination of whether the receiver is located inside of the specified surrounding region is also based on the distance between the receiver and the first transmitter in addition to the determined angular arrangement of the receiver with respect to the first transmitter.

28. The transportation vehicle of claim 14, wherein the activation of the first transmitter to emit an additional electromagnetic field includes phase-shifted energizing of at least three coils of the first transmitter arranged in the plane.

29. The transportation vehicle of claim 14, wherein the first transmitter is activated to emit the additional electromagnetic field with a time dependence of the transmission power and/or of the frequency, and wherein a time constant of the time dependence of the transmission power and/or the frequency is greater than a time constant of the time-averaged value of the amplitude of the additional electromagnetic field.

30. The transportation vehicle of claim 14, wherein a 180° ambiguity produced by the at least two electromagnetic fields emitted by the first transmitter is resolved by emission of an electromagnetic field by the second transmitter.

* * * * *